United States Patent
Renard et al.

(10) Patent No.: US 10,789,953 B2
(45) Date of Patent: Sep. 29, 2020

(54) VOICE AND CONNECTION PLATFORM

(71) Applicant: XBrain, Inc., Menlo Park, CA (US)

(72) Inventors: Gregory Renard, Menlo Park, CA (US); Mathias Herbaux, Lille (FR)

(73) Assignee: XBrain, Inc., Menlo Park, CA (US)

( * ) Notice: Subject to any disclaimer, the term of this patent is extended or adjusted under 35 U.S.C. 154(b) by 0 days.

(21) Appl. No.: 16/277,844

(22) Filed: Feb. 15, 2019

(65) Prior Publication Data
US 2019/0180750 A1 Jun. 13, 2019

Related U.S. Application Data

(63) Continuation of application No. 14/871,272, filed on Sep. 30, 2015, now Pat. No. 10,235,996.

(60) Provisional application No. 62/058,508, filed on Oct. 1, 2014.

(51) Int. Cl.
| | |
|---|---|
| *G10L 15/22* | (2006.01) |
| *G10L 15/30* | (2013.01) |
| *G10L 15/18* | (2013.01) |
| *G10L 15/24* | (2013.01) |
| *G06F 3/16* | (2006.01) |

(52) U.S. Cl.
CPC .............. *G10L 15/22* (2013.01); *G06F 3/167* (2013.01); *G10L 15/18* (2013.01); *G10L 15/24* (2013.01); *G10L 15/30* (2013.01); *G10L 15/1822* (2013.01); *G10L 2015/223* (2013.01); *G10L 2015/226* (2013.01); *G10L 2015/227* (2013.01); *G10L 2015/228* (2013.01)

(58) Field of Classification Search
CPC ... G10L 15/22; G10L 2015/223; G10L 15/30; G10L 15/1822; G10L 2015/227; G10L 2015/228; G10L 15/24
See application file for complete search history.

(56) References Cited

U.S. PATENT DOCUMENTS

| | | | |
|---|---|---|---|
| 5,797,123 A | 8/1998 | Chou et al. | |
| 6,192,339 B1 | 2/2001 | Cox | |
| 6,330,537 B1 | 12/2001 | Davis et al. | |
| 6,442,519 B1 | 8/2002 | Kanevsky et al. | |
| 7,149,695 B1 | 12/2006 | Bellegarda | |

(Continued)

FOREIGN PATENT DOCUMENTS

| | | |
|---|---|---|
| CN | 1645477 A | 7/2005 |
| CN | 1981257 A | 6/2007 |

(Continued)

OTHER PUBLICATIONS

JP First Office ActionNotice of Reason for Rejection, Japanese Patent Application No. 2017-538155, Japan Patent Office, dated Oct. 11, 2019 (with translation), 12 pages.

(Continued)

*Primary Examiner* — Eric Yen
(74) *Attorney, Agent, or Firm* — Patent Law Works LLP

(57) ABSTRACT

A system and method for providing a voice assistant including receiving, at a first device, a first audio input from a user requesting a first action; performing automatic speech recognition on the first audio input; obtaining a context of user; performing natural language understanding based on the speech recognition of the first audio input; and taking the first action based on the context of the user and the natural language understanding.

18 Claims, 7 Drawing Sheets

(56) References Cited

U.S. PATENT DOCUMENTS

| | | |
|---|---|---|
| 7,752,152 B2 | 7/2010 | Paek et al. |
| 8,165,866 B2 | 4/2012 | Cha et al. |
| 8,165,886 B1 | 4/2012 | Gagnon et al. |
| 8,332,218 B2 | 12/2012 | Cross, Jr. et al. |
| 8,406,384 B1 | 3/2013 | Tremblay et al. |
| 8,453,058 B1 | 5/2013 | Coccaro et al. |
| 8,595,642 B1 | 11/2013 | Lagassey |
| 8,606,568 B1 | 12/2013 | Tickner et al. |
| 8,938,394 B1* | 1/2015 | Faaborg ................. G10L 15/22 704/275 |
| 9,318,108 B2 | 4/2016 | Gruber et al. |
| 9,466,294 B1 | 10/2016 | Tunstall-Pedoe et al. |
| 9,495,956 B2 | 11/2016 | Meisel et al. |
| 10,049,656 B1* | 8/2018 | Barton ................. G10L 15/183 |
| 2001/0047261 A1 | 11/2001 | Kassan |
| 2002/0133354 A1 | 9/2002 | Ross et al. |
| 2002/0196911 A1* | 12/2002 | Gao ..................... H04M 1/271 379/88.03 |
| 2005/0086056 A1 | 4/2005 | Yoda et al. |
| 2005/0209856 A1 | 9/2005 | Kii |
| 2006/0206333 A1 | 9/2006 | Paek et al. |
| 2007/0050191 A1 | 3/2007 | Weider et al. |
| 2007/0061335 A1* | 3/2007 | Ramer ................... G10L 15/26 |
| 2008/0015864 A1 | 1/2008 | Ross et al. |
| 2008/0289002 A1 | 11/2008 | Portele et al. |
| 2009/0234635 A1 | 9/2009 | Bhatt et al. |
| 2012/0016678 A1 | 1/2012 | Gruber et al. |
| 2012/0259633 A1 | 10/2012 | Aihara et al. |
| 2013/0144616 A1* | 6/2013 | Bangalore ............ G10L 15/075 704/226 |
| 2013/0339022 A1* | 12/2013 | Baldwin ................ G10L 15/22 704/257 |
| 2014/0038578 A1 | 2/2014 | Bouzid et al. |
| 2014/0130696 A1 | 5/2014 | Wolverton et al. |
| 2014/0343950 A1 | 11/2014 | Simpson et al. |
| 2015/0053781 A1 | 2/2015 | Nelson et al. |
| 2015/0162000 A1 | 6/2015 | Di Censo et al. |
| 2015/0169284 A1* | 6/2015 | Quast ................. G06F 16/9535 704/275 |
| 2015/0187369 A1* | 7/2015 | Dadu ..................... G10L 25/48 704/275 |
| 2015/0279366 A1 | 10/2015 | Krestnikov et al. |
| 2015/0348548 A1* | 12/2015 | Piernot ................... G06F 3/013 704/235 |
| 2016/0063993 A1* | 3/2016 | Dolan ................... G06F 40/279 704/254 |
| 2016/0217784 A1* | 7/2016 | Gelfenbeyn .......... G10L 13/043 |

FOREIGN PATENT DOCUMENTS

| | | |
|---|---|---|
| CN | 101292282 A | 10/2008 |
| CN | 101535983 A | 9/2009 |
| JP | 2003131691 A | 5/2003 |
| JP | 2006127148 A | 5/2006 |
| JP | 2006137366 A | 6/2006 |
| JP | 2006285416 A | 10/2006 |
| JP | 2013080476 A | 5/2013 |
| WO | 2014130696 | 8/2014 |

OTHER PUBLICATIONS

International Search Report Written Opinion for PCT Application No. PCT/US15/53251 dated Dec. 30, 2015, 12 pages.

Extended European Search Report for EP Application No. 15846915.5, dated May 7, 2018, 8 pgs.

Chinese First Office Action, Chinese Patent Application No. 2015800607125, China National Intellectual Property Administration, dated Jan. 2, 2020 (with translation), 19 pages.

* cited by examiner

VOICE AND CONNECTION PLATFORM

CROSS-REFERENCE TO RELATED APPLICATIONS

This application is a continuation of and claims priority to U.S. application Ser. No. 14/871,272, filed Sep. 30, 2015, titled "Voice and Connection Platform," which claims priority under 35 U.S.C. § 119(e) to U.S. Provisional Patent Application No. 62/058,508, filed on Oct. 1, 2014, entitled "Voice and Connection Platform" which is herein incorporated by reference in its entirety.

BACKGROUND

Present voice assistants include Apple's Siri, Google's Google Now and Microsoft's Cortana. A first problem with such present systems do not allow a user to interact with the personal assistant conversationally as the user would with a human. A second problem with such present systems is that the user is too often not understood or misunderstood or the present systems defaults quickly to a web search. A third problem with such present systems is that they are not proactive in assisting their user. A fourth problem is that such present systems are limited in the applications they interact with, for example, such voice assistants may only interact with a limited number of applications. A fifth problem is that such present systems do not utilize the user's context. A sixth problem is that such present systems do not integrate with other voice assistants.

SUMMARY

In one embodiment, the voice and connection engine provides a voice assistant that remedies one or more of the aforementioned deficiencies of existing voice assistants. In one embodiment, the voice and connection engine uses an agnostic and modular approach to one or more of the automatic speech recognition, natural language understanding and text to speech components thereby allowing frequent updates to those components as well as simplifying the adaptation of the system to different languages. In one embodiment, the voice and connection engine manages context in order to provide a more natural and human-like dialogue with the user and to increase the accuracy of the understanding of the user's requests and reduce the amount of time between receiving a request and executing on the request. In one embodiment, the voice and connection engine provides a work around to obtain a user's intended request rather than immediately defaulting to a web search. In one embodiment, the voice and connection engine utilizes modules to interact with various applications of the user device (e.g. phone, unified messenger, news, media, weather, browser for web search, etc.) and modules may be individually added or modified over time as applications are added and updated. In one embodiment, the modules for interacting with the applications provide a level of standardization in user commands. For example, a user may use the verbal request "send a message" to send a message via Facebook, email or twitter.

In one embodiment, the method includes receiving, at a first device, a first audio input from a user requesting a first action; performing automatic speech recognition on the first audio input; obtaining a context of user; performing natural language understanding based on the speech recognition of the first audio input; and taking the first action based on the context of the user and the natural language understanding.

Other aspects include corresponding methods, systems, apparatus, and computer program products for these and other innovative features. These and other implementations may each optionally include one or more of the following features. For instance, the operations further include: the first audio input is received responsive to an internal event. For instance, the operations further include: initiating a voice assistant without user input and receiving the first audio input from the user subsequent to the initiation of the voice assistant. For instance, the operations further include: the context including one or more of a context history, a dialogue history, a user profile, a user history, a location and a current context domain. For instance, the operations further include: subsequent to taking the action, receiving a second audio input from the user requesting a second action unrelated to the first action; taking the second action; receiving a third audio input from the user requesting a third action related to the first action, the third audio input missing information used to take the third action; obtaining the missing information using the context; and taking the third action. For instance, the operations further include: the missing information is one or more of an action, an actor and an entity. For instance, the operations further include: receiving, at a second device, a second audio input from the user requesting a second action related to the first action, the second audio input missing information used to take the second action; obtaining the missing information using the context; and taking the second action based on the context. For instance, the operations further include: determining that the context and the first audio input are missing information used to take the first action; determining what information is the missing information; and prompting the user to provide a second audio input supplying the missing information. For instance, the operations further include: determining that information used to take the first action is unable to be obtained from the first audio input; determining what information is the missing information; and prompting the user to provide a second audio input supplying the information unable to be obtained from the first audio input. For instance, the operations further include: determining that information used to take the first action is unable to be obtained from the first audio input; determining what information is missing from information used to take the first action; providing for selection by the user a plurality of options, an option supplying potential information for completing the first action; and receiving a second audio input selecting a first option from the plurality of options.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
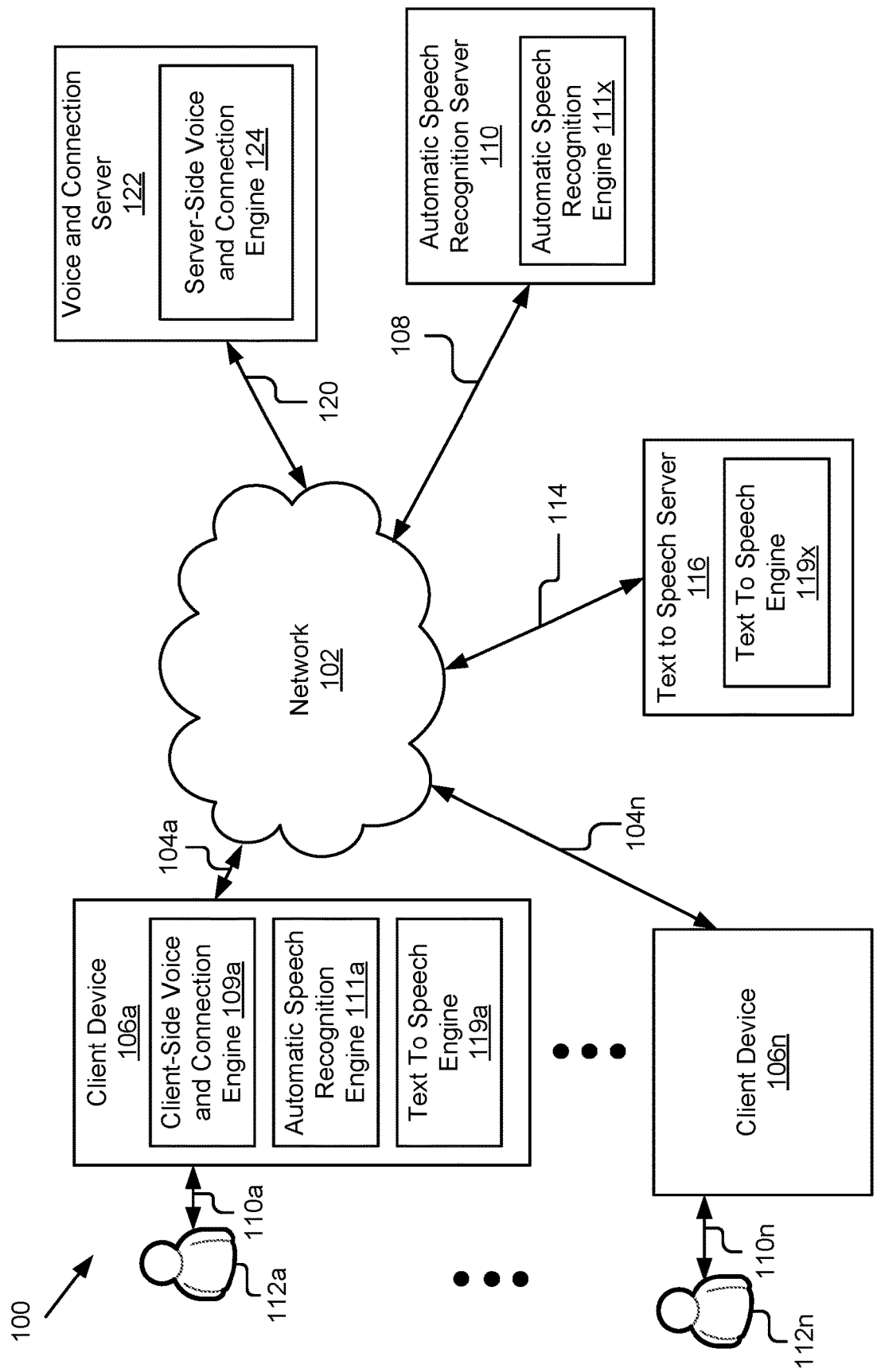
FIG. 1 is a block diagram illustrating an example system for voice and connection platform according to one embodiment.

FIG. 1 is a block diagram illustrating an example system 100 for a voice and connection platform according to one embodiment. The illustrated system 100 includes client devices 106a . . . 106n, an automatic speech recognition (ASR) server 110, a voice and connection server 122 and a text to speech (TTS) server 116, which are communicatively coupled via a network 102 for interaction with one another. For example, the client devices 106a . . . 106n may be respectively coupled to the network 102 via signal lines 104a . . . 104n and may be accessed by users 112a . . . 112n (also referred to individually and collectively as user 112) as illustrated by lines 110a . . . 110n. The automatic speech recognition server 110 may be coupled to the network 102 via signal line 108. The voice and connection server 122 may be coupled to the network 102 via signal line 120. The text to speech server 116 may be connected to the network 102 via signal line 114. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), Java DataBase Connectivity (JDBC), Open DataBase Connectivity (ODBC), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks. Additionally, the data exchanged over network 102 may be compressed.

The client devices 106a . . . 106n (also referred to individually and collectively as client device 106) are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and/or other software and/or hardware components, such as a display, graphics processor, wireless transceivers, keyboard, speakers, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, automobiles, robots, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. For example, in one embodiment, the client device 106a is an automobile and client device 106n is a mobile phone.

In the depicted implementation, the client devices 106a includes an instance of a client-side voice and connection engine 109a, an automatic speech recognition engine 111a and a text to speech engine 119a. While not shown, client device 106n may include its own instance of a client-side voice and connection engine 109n, an automatic speech recognition engine 111n and a text to speech engine 119n. In one embodiment, an instance of a client-side voice and connection engine 109, an automatic speech recognition engine 111 and a text to speech engine 119 may be storable in a memory of the client device 106 and executable by a processor of the client device 106.

The text to speech (TTS) server 116, the automatic speech recognition (ASR) server 110 and the voice and connection server 122 may include one or more computing devices having data processing, storing, and communication capabilities. For example, these entities 110, 116, 122 may include one or more hardware servers, server arrays, storage devices, systems, etc., and/or may be centralized or distributed/cloud-based. In some implementations, these entities 110, 116, 122 may include one or more virtual servers, which operate in a host server environment and access the physical hardware of the host server including, for example, a processor, memory, storage, network interfaces, etc., via an abstraction layer (e.g., a virtual machine manager).

The automatic speech recognition (ASR) engine 111 performs automatic speech recognition. For example, in one embodiment, the ASR engine 111 receives an audio (e.g.

voice) input and converts the audio into a string of text. Examples of ASR engines 111 include, but are not limited to, Nuance, Google Voice, Telisma/OnMobile, etc.

Depending on the embodiment, the ASR engine 111 may be on-board, off-board or a combination thereof. For example, in one embodiment, the ASR engine 111 is on-board and ASR is performed on the client device 106 by ASR engine 111a and ASR engine 111x and the ASR server 110 may be omitted. In another example, in one embodiment, the ASR engine 111 is off-board (e.g. streaming or relay) and ASR is performed on the ASR server 110 by ASR engine 111x and ASR engine 111a may be omitted. In yet another example, ASR is performed at both the client device 106 by ASR engine 111a and the ASR server 110 by the ASR engine 111x.

The text to speech (TTS) engine 119 performs text to speech. For example, in one embodiment, the TTS engine 119 receives text or other non-speech input (e.g. a request for additional information as discussed below with reference to the work around engine 328 of FIG. 3) and outputs human recognizable speech that is presented to the user 112 through an audio output of the client device 106. Examples of ASR engines 111 include, but are not limited to, Nuance, Google Voice, Telisma/OnMobile, Creawave, Acapella, etc.

Depending on the embodiment, the TTS engine 119 may be on-board, off-board or a combination thereof. For example, in one embodiment, the TTS engine 119 is on-board and TTS is performed on the client device 106 by TTS engine 119a and TTS engine 119x and the TTS server 116 may be omitted. In another example, in one embodiment, the TTS engine 119 is off-board (e.g. streaming or relay) and TTS is performed on the TTS server 116 by TTS engine 119x and TTS engine 119a may be omitted. In yet another example, TTS is performed at both the client device 106 by TTS engine 116a and the TTS server 116 by the TTS engine 116x.

Figure 3:
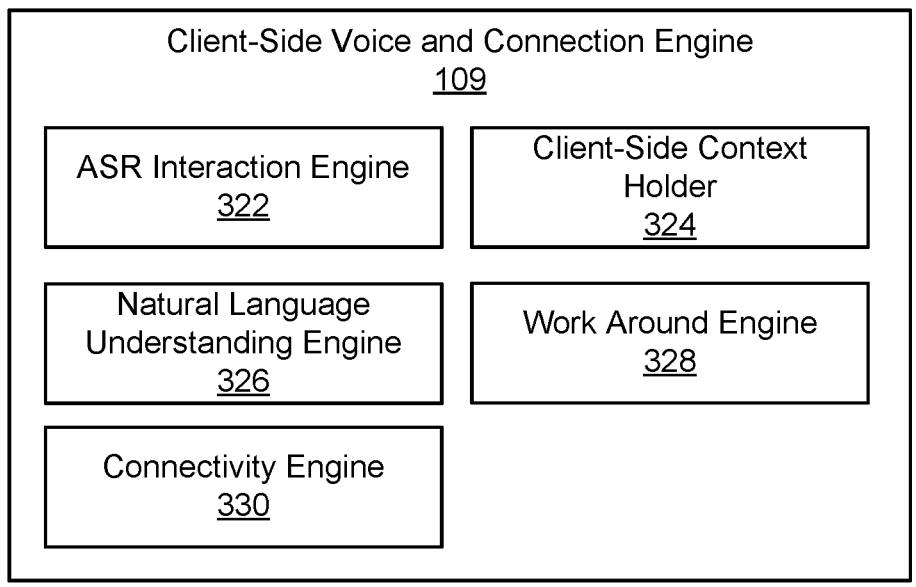
FIG. 3 is a block diagram illustrating an example of a client-side voice and connection engine according to one embodiment.
Figure 4:
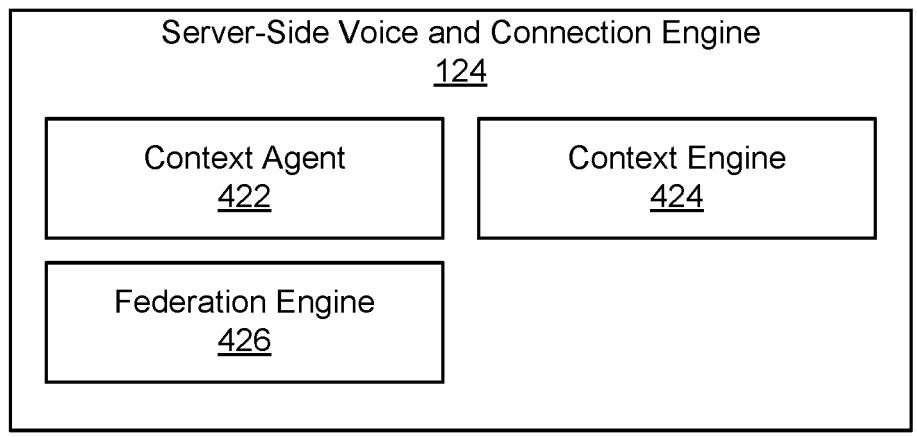
FIG. 4 is a block diagram illustrating an example of a server-side voice and connection engine according to one embodiment.

In the illustrated embodiment, the voice and connection engine is split into two components 109, 124; one client-side and one server-side. Depending on the embodiment, the voice and connection engine may be on-board, off-board or a hybrid of the two. In another example, in one embodiment, the voice and connection engine is on-board and the features and functionality discussed below with regard to FIGS. 3 and 4 are performed on the client device 106. In another example, in one embodiment, the voice and connection engine is off-board and the features and functionality discussed below with regard to FIGS. 3 and 4 are performed on the voice and connection server 122. In yet another example, in one embodiment, the voice and connection engine is a hybrid and the features and functionality discussed below with regard to FIGS. 3 and 4 are split between the client-side voice and connection engine 109 and the server-side voice and connection engine 124. Although it should be recognized that the features and functionality may be divided differently than the illustrated embodiments of FIGS. 3 and 4. In one embodiment, the voice and connection engine provides a voice assistant that uses context and artificial intelligence and provides natural dialog with a user 112 and can work around shortcomings in user requests (e.g. failure of voice recognition).

In one embodiment, the client-side (on-board) voice and connection engine 109 manages dialog and connects to the server-side (off-board) voice and connection platform 124 for extended semantic processing. Such an embodiment may beneficially provide synchronization to allow for loss and recover of connectivity between the two. For example, assume that the user is going through a tunnel and has no network 102 connectivity. In one embodiment, when the system 100 detects the lack of network 102 connectivity and analyzes the voice input (i.e. query/request) locally on the client device 106 using a "lite" local version of an automatic speech recognition engine 111 and natural language understanding engine 326 to execute, but when network 102 connectivity is available the ASR and Natural Language Understanding (NLU) are performed at server-side versions of those engines that provide greater semantics, vocabularies and processing abilities. In one embodiment, if the user's request requires network 102 connectivity, the system may verbally notify the user that it lacks network 102 connectivity the user's request will be processed when network 102 connectivity is re-established.

It should be understood that the system 100 illustrated in FIG. 1 is representative of an example system for speech and connectivity according to one embodiment and that a variety of different system environments and configurations are contemplated and are within the scope of the present disclosure. For instance, various functionality may be moved from a server to a client, or vice versa and some implementations may include additional or fewer computing devices, servers, and/or networks, and may implement various functionality client or server-side. Further, various entities of the system 100 may be integrated into to a single computing device or system or divided among additional computing devices or systems, etc.

Figure 2:
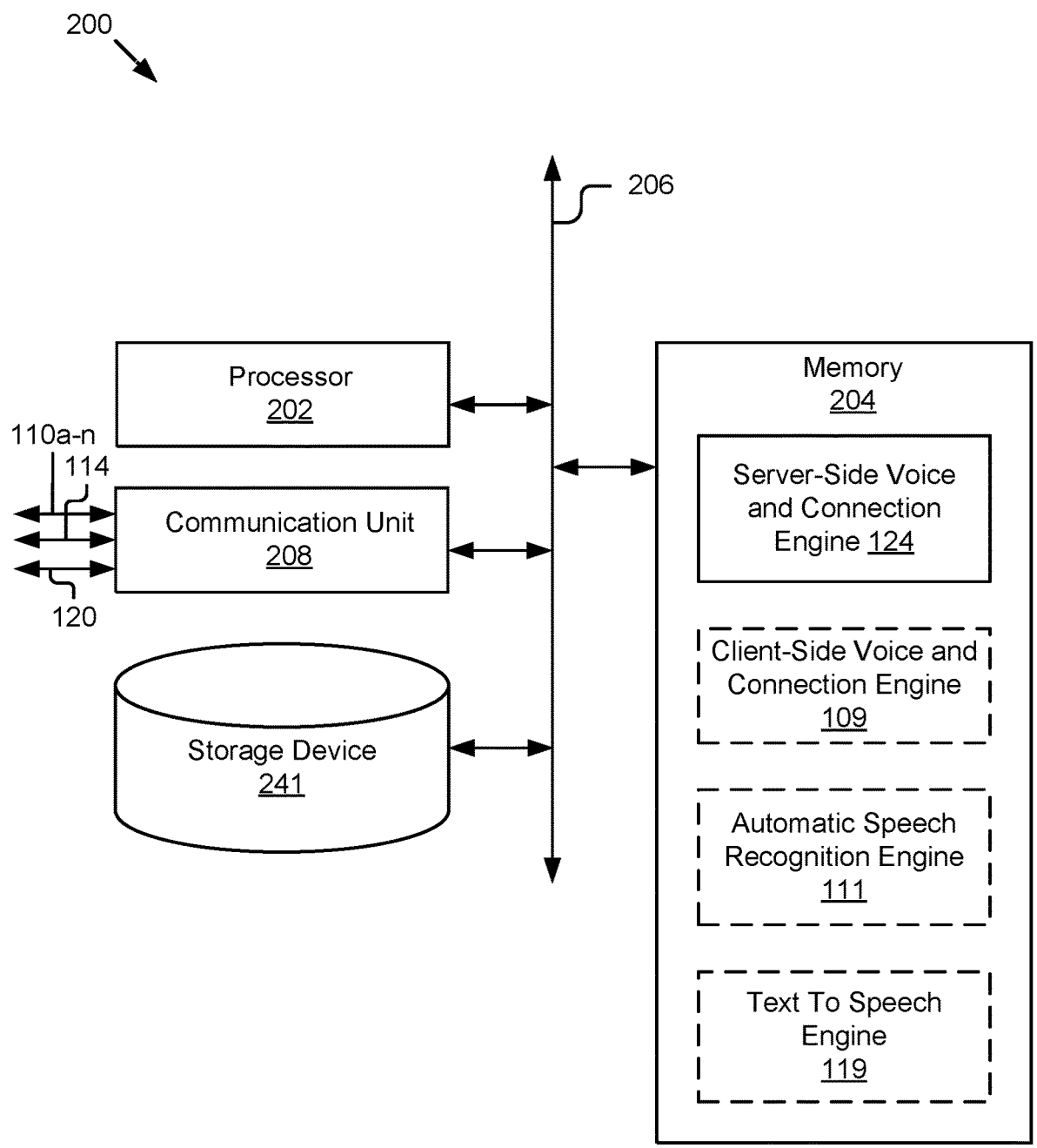
FIG. 2 is a block diagram illustrating an example computing device according to one embodiment.

FIG. 2 is a block diagram of an example computing device 200 according to one embodiment. The computing device 200, as illustrated, may include a processor 202, a memory 204, a communication unit 208, and a storage device 241, which may be communicatively coupled by a communications bus 206. The computing device 200 depicted in FIG. 2 is provided by way of example and it should be understood that it may take other forms and include additional or fewer components without departing from the scope of the present disclosure. For example, while not shown, the computing device 200 may include input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein can be applied to multiple entities in the system 100 with various modifications, including, for example, the TTS server 116 (e.g. by including the TTS engine 119 and omitting the other illustrated engines), a ASR server 110 (e.g. by including an ASR engine 111 and omitting the other illustrated engines), a client device 106 (e.g. by omitting the server-side voice and connection engine 124) and a voice and connection server 122 (e.g. by including the server-side voice and connection engine 124 and omitting the other illustrated engines).

The processor 202 comprises an arithmetic logic unit, a microprocessor, a general purpose controller, a field programmable gate array (FPGA), an application specific integrated circuit (ASIC), or some other processor array, or some combination thereof to execute software instructions by performing various input, logical, and/or mathematical operations to provide the features and functionality described herein. The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the application server 122 including, for example, the memory 204, communication unit 208, and the storage device 241.

The memory 204 may store and provide access to data to the other components of the computing device 200. In some implementations, the memory 204 may store instructions and/or data that may be executed by the processor 202. For example, as depicted, the memory 204 may store one or more engines 109, 111, 119, 124. The memory 204 is also capable of storing other instructions and data, including, for example, an operating system, hardware drivers, software applications, databases, etc. The memory 204 may be coupled to the bus 206 for communication with the processor 202 and the other components of the computing device 200.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 204 may be a single device or may include multiple types of devices and configurations.

The bus 206 can include a communication bus for transferring data between components of the computing device or between computing devices 106/110/116/122, a network bus system including the network 102 or portions thereof, a processor mesh, a combination thereof, etc. In some implementations, the engines 109, 111, 119, 124, their subcomponents and various software operating on the computing device 200 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSL, HTTPS, etc.).

The communication unit 208 may include one or more interface devices (UF) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 103, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The storage device 241 is an information source for storing and providing access to data. In some implementations, the storage device 241 may be coupled to the components 202, 204, and 208 of the computing device via the bus 206 to receive and provide access to data. The data stored by the storage device 241 may vary based on the computing device 200 and the embodiment. For example, in one embodiment, the storage device 241 of a client device 106 may store information about the user's current context and session and the storage device 241 of voice and connection server 122 stores medium and long term contexts, aggregated user data used for machine learning, etc.

The storage device 241 may be included in the computing device 200 and/or a storage system distinct from but coupled to or accessible by the computing device 200. The storage device 241 can include one or more non-transitory computer-readable mediums for storing the data. In some implementations, the storage device 241 may be incorporated with the memory 204 or may be distinct therefrom. In some implementations, the storage device 241 may include a database management system (DBMS) operable on the application server 122. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

As mentioned above, the computing device 200 may include other and/or fewer components. Examples of other components may include a display, an input device, a sensor, etc. (not shown). In one embodiment, the computing device includes a display. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the application server 122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In one embodiment, the computing device 200 may represent a client device 106 and the client device 106 includes a microphone for receiving voice input and speakers for facilitating text-to-speech (TTS). In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Client-Side Voice and Connection Engine 109

Referring now to FIG. 3, a block diagram of an example client-side voice and connection engine 109 is illustrated according to one embodiment. In the illustrated embodiment, the client-side voice and connection engine 109 comprises an automatic speech recognition (ASR) engine 322, a client-side context holder 324, a natural language understanding (NLU) engine 326, a work around engine 328 and a connection engine 330.

The automatic speech recognition (ASR) interaction engine 322 includes code and routines for interacting with an automatic speech recognition (ASR) engine 111. In one embodiment, the ASR interaction engine 322 is a set of instructions executable by the processor 202. In another embodiment, the ASR interaction engine 322 is stored in the memory 204 and is accessible and executable by the processor 202. In either embodiment, the ASR interaction engine 322 is adapted for cooperation and communication with the processor 202, an ASR engine 111, and other components of the system 100.

The ASR interaction engine 322 interacts with an ASR engine 111. In one embodiment, the ASR engine 111 is local to the client device 106. For example, the ASR interaction engine 322 interacts with an ASR engine 111 that is an on-board ASR application such as ASR engine 111a. In one embodiment, the ASR engine 111 is remote from the client device 106. For example, the ASR interaction engine 322 interacts with an ASR engine 111 that is an off-board ASR application accessible and used via network 102 such as ASR engine 111x. In one embodiment, the ASR engine 111 is a hybrid including components both local to and remote from the client device 106. For example, the ASR interaction engine 322 interacts with an off-board ASR engine 111x when the client device 106 has network 102 connectivity in order to reduce the processing burden on the client device 106 and improve the battery life thereof and interacts with an on-board ASR engine 111a when network 102 connectivity is unavailable or insufficient.

In one embodiment, the ASR interaction engine 322 interacts with the ASR engine 111 by initiating the voice input of the ASR engine 111. In one embodiment, the ASR interaction engine 322 may initiate the voice input of the ASR engine 111 responsive to detecting one or more events. In some embodiments, the ASR interaction engine 322 initiates the ASR proactively, without waiting for the user 112 to begin the dialog. Examples of events include, but are not limited, to a wake-up word or phrase, an expiration of a timer, user input, an internal event, an external event, etc.

In one embodiment, the ASR interaction engine 322 initiates the voice input of the ASR engine 111 responsive to detecting a wake-up word or phrase. For example, assume the voice and connection platform is associated with a persona to interact with users and the persona is named "Sam;" in one embodiment, the ASR interaction engine 322 detects when the word "Sam" is received via a client device's microphone and initiates voice input for the ASR engine 111. In another example, assume the phrase "Hey you!" is assigned as a wake-up phrase; in one embodiment, the ASR interaction engine 322 detects when the phrase "Hey you!" is received via a client device's microphone and initiates voice input for the ASR engine 111.

In one embodiment, the ASR interaction engine 322 initiates the voice input of the ASR engine 111 responsive to detecting an expiration of a timer. For example, the system 100 may determine that a user wakes up at 7 AM and leaves work at 6 PM; in one embodiment, sets a timer for 7 AM and a timer for 6 PM and the ASR interaction engine 322 initiates the voice input for the ASR engine 111 at those times. For example, so the user may request news or weather when waking up at 7 AM and may request a traffic report or to initiate a call to his/her spouse when leaving work at 6 PM.

In one embodiment, the ASR interaction engine 322 initiates the voice input of the ASR engine 111 responsive to detecting a user input. For example, the ASR interaction engine 322 initiates the voice input of the ASR engine 111 responsive to detecting a gesture (e.g. a specific swipe or motion on a touch screen) or button (physical or soft/virtual) selection (e.g. selecting a dedicated button or long-pressing a multi-purpose button). It should be recognized that the button referred to may be on the client device 106 or a component associated with the client device 106 (e.g. dock, cradle, Bluetooth headset, smart watch, etc.)

In one embodiment, the ASR interaction engine 322 initiates the voice input of the ASR engine 111 responsive to detecting an internal event. In one embodiment, the internal event is based on a sensor of the client device 106 (e.g. GPS, accelerometer, power sensor, docking sensor, Bluetooth antenna, etc.). For example, the ASR interaction engine 322 initiates the voice input of the ASR responsive to detecting that the user device 106 is located in the user's car (e.g. detects on board diagnostics of car, power and connection to in-car cradle/dock etc.) and initiates the voice input of the ASR engine 111 (e.g. to receive a user's request for navigation directions or music to play). In one embodiment, the internal event is based on an application (not shown) of the client device 106. For example, assume the client device 106 is a smart phone with a calendar application and the calendar application includes an appointment for the user at a remote location; in one embodiment, the ASR initiates the voice input of the ASR engine responsive to detecting the appointment (e.g. to receive a user's request for directions to the appointment's location). In one embodiment, the internal event is based on an operation of a local text to speech engine 119a. For example, assume the text to speech engine 119 operates in order to present a contextual prompt (e.g. "It appears you are leaving work would you like to call your wife and navigate home?"), or other prompt, to the user; in one embodiment, the ASR interaction engine 322 detects the text-to-speech prompt and initiates the voice input of the ASR engine 111 to receive the user's response to the prompt.

In one embodiment, the ASR interaction engine 322 initiates the voice input of the ASR engine 111 responsive to detecting an external event (e.g. from a third party API or database). In one embodiment, the internal event is based on an operation of a remote text to speech engine 119x. For example, assume the text to speech engine 119 operates in order to present a contextual prompt (e.g. "It appears you are leaving work would you like to call your wife and navigate home?," or "you are approaching your destination would you like me to direct you to available parking?"), or other prompt, to the user; in one embodiment, the ASR interaction engine 322 detects the text-to-speech prompt and initiates the voice input of the ASR engine 111 to receive the user's response to the prompt.

In one embodiment, the ASR interaction engine 322 is agnostic. For example, in one embodiment, the ASR interaction engine 322 may use one or more different ASR engines 111. Examples of ASR engines 111 include, but are not limited to, Nuance, Google Voice, Telisma/OnMobile, Creawave, Acapella, etc. An agnostic ASR interaction engine 322 may beneficially allow flexibility in the ASR engine 111 used and the language of the ASR engine 111 and may allow the ASR engine(s) 111 used to be changed through the life-cycle of the voice and connection system 100 as new ASR engines 111 become available and existing ASR engines are discontinued. In some embodiments, the system 100 includes multiple ASR engines and the ASR engine 111 used depends on the context. For example, assume Google Voice provides better recognition of proper names than Nuance; in one embodiment, the ASR interaction engine 322 may interact with the Google Voice ASR when it is determined that the user has accessed the contact list of a phone application. In some embodiments, the system 100 may switch between the ASR engines at any time (e.g. process a first portion of a voice input with a first ASR engine 111 and a second portion of the voice input with a second ASR 111). Similar to the ASR engine 111, in one embodiment, the system 100 is agnostic with respect to the TTS engine 119 used. Also similar to the ASR engine 111, in some embodiments, the system 100 may include multiple TTS engines 119 and may select and use different TTS engines for different contexts and/or may switch between different TTS engines at any time. For example, in one embodiment, the system 100 may begin reading a headline in English and the user may request French and the system will transition to a English to French TTS engine.

The ASR engine 111 receives the voice input subsequent to the ASR interaction engine 322 initiating the voice input. In one embodiment, responsive to initiation, the ASR engine 111 receives the voice input without additional involvement of the ASR interaction engine 322. In one embodiment, subsequent to initiating the voice input, the ASR interaction engine 322 passes the voice input to the ASR engine 111. For example, the ASR interaction engine 322 is communicatively coupled to an ASR engine 111 to send the voice input to the ASR engine 111. In another embodiment, subsequent to initiating the voice input, the ASR interaction engine 322 stores the voice input in a storage device (or any other non-transitory storage medium communicatively accessible), and the voice input may be retrieved by the ASR engine 111 by accessing the storage device (or other non-transitory storage medium).

In some embodiments, the system 100 proactively provides an electronic voice assistant without receiving user input such as voice input. For example, in one embodiment, the system 100 may determine the car (i.e. a client device 106 is in a traffic jam and automatically initiates TTS and begins a dialog with the user (e.g. "Would you like me to provide an alternate route?"), or performs an action (e.g. determines alternate route such as parking and taking the train and updates the navigation route accordingly).

The client-side context holder 324 includes code and routines for context synchronization. In one embodiment, context synchronization includes managing the definition, usage and storage of the context workflow from the client-side and sharing the context workflow with the server-side. In one embodiment, the client-side context holder 324 is a set of instructions executable by the processor 202. In another embodiment, the client-side context holder 324 is stored in the memory 204 and is accessible and executable by the processor 202. In either embodiment, the client-side context holder 324 is adapted for cooperation and communication with the processor 202, other components of the client device 106 and other components of the system 100.

The client-side context holder 324 manages the definition, usage and storage of the context workflow from the client-side and shares the context workflow with the server-side. In one embodiment, the client-side context holder 324 communicates with the context agent 420 (server-side context holder) using a context synchronization protocol in order to synchronize the context within the system 100 despite itinerancy and low capacity on the network 102 (which may be particularly beneficial on some networks, e.g., a mobile data network).

The client side context holder 324 manages the definition, usage and storage of the context. The context is the current status of the personal assistant provided by the voice and connection engine. In one embodiment, the context comprises one or more parameters. Examples of parameters include, but are not limited to, context history, dialog history (e.g. the user's previous requests and the system's previous responses and actions), user profile (e.g. the user's identity and preferences), user history (e.g. user's habits), location (client device's 106 physical location), current context domain (e.g. client device 106, application(s) being used, interface presently presented to user). In some embodiments, a parameter may be a variable or a serialized object.

In one embodiment, the context is a multi-dimensional context and can describe any dimensional variable or feature. In some embodiments, the context uses a multi-dimensional matrix. As is described herein, in some embodiments, the context is synchronized in real-time between the client-side (e.g. client device 106a) and the server-side (e.g. voice and connection server 122). Because of the combination of the deep integration of the synchronization in both parts of the platform (client and server) and the context's ability to describe any dimensional variable or feature, the context may occasionally be referred to as a "Deep Context."

Depending on the embodiment, the context is used by the system 100 to provide one or more benefits including, but not limited to, increasing the system's 100 ability to accurately recognize words from speech, determine a user's intended request and facilitate more natural dialog between the user 112 and the system 100.

In one embodiment, the context is used to more accurately recognize words from speech. For example, assume the user has the phone application open; in one embodiment, the context may be used (e.g. by the NLU engine 326 during preprocessing) to limit the dictionary used by the natural language understanding engine 326 (e.g. to names of contacts and words associated with operating a phone or conducting a call). In one embodiment, such dictionary limitation may beneficially eliminate "Renault" the car company but leave "Renaud" the name so that the NLU engine 326 may accurately determine that the user wants to call Renaud and not Renault. The NLU engine 326 may even determine which Renaud the user intends to call (assuming multiple contacts named Renaud) based on previous phone calls made by the user. Therefore, the preceding example also demonstrates an embodiment in which the context is used to more accurately determine the user's intended request (i.e. to call Renaud). Accordingly, the context may also minimize the amount of time from receiving the user's request to accurately executing on the request.

In one embodiment, the context is used to facilitate more natural dialog (bi-directional communication) between the user and the system 100. For example, context may be used to facilitate a dialog where the user requests news about Yahoo!; the system begins reading headlines of articles about Yahoo!. The user asks "who is the CEO?"; the system 100 understands that the user's intended request is for the CEO of Yahoo! and searches for and provides that name. The user then asks for today's weather; the system 100 understands that this request is associated with a weather application, and that the user's intended request is for the weather for the user's physical location determines that the a weather application should be used and makes an API call to the weather application to obtain the weather. The user then says "and tomorrow"; the system 100 understands that the user's intended request is for the weather at the user's present location tomorrow. The user then asks "what's the stock trading at?"; the system 100 understands the user's intended request is for the present trading price of Yahoo! stock and performs a web search to obtain that information. To summarize and simplify, in some embodiments, the context may track the topic, switch between applications and track a state in the work flows of the various applications to enable a more "natural" dialogue between the user 112 and the system 100 by supporting such context jumping.

In some embodiments, machine learning is applied to contexts. For example, to learn a probability of a next step or command based on data aggregated from numerous users and how users in general interact with the system 100 or for a particular user based on that user's data and how that user interacts with the system 100.

In one embodiment, the client side context holder 324 synchronizes the user's present context with the context agent 420 of FIG. 4. Synchronizing the context with the server-side voice and connection engine 124 allows the client-side voice and connection engine 109 to optionally have the server-side engine 124 manage the dialog and perform the various operations or to perform the functions at the client device 106 based on, e.g., connectivity to the server 122.

In one embodiment, the client-side holder 324 and context agent 420 (i.e. server-side holder) communicate using a context synchronization protocol that provides a communication protocol as well as verify that the context information being synchronized is delivered. In one embodiment, the context synchronization protocol standardizes key access (e.g. a context ID) for each property (e.g. variable or parameter) of the status or sub-status of the current context.

Figure 8:
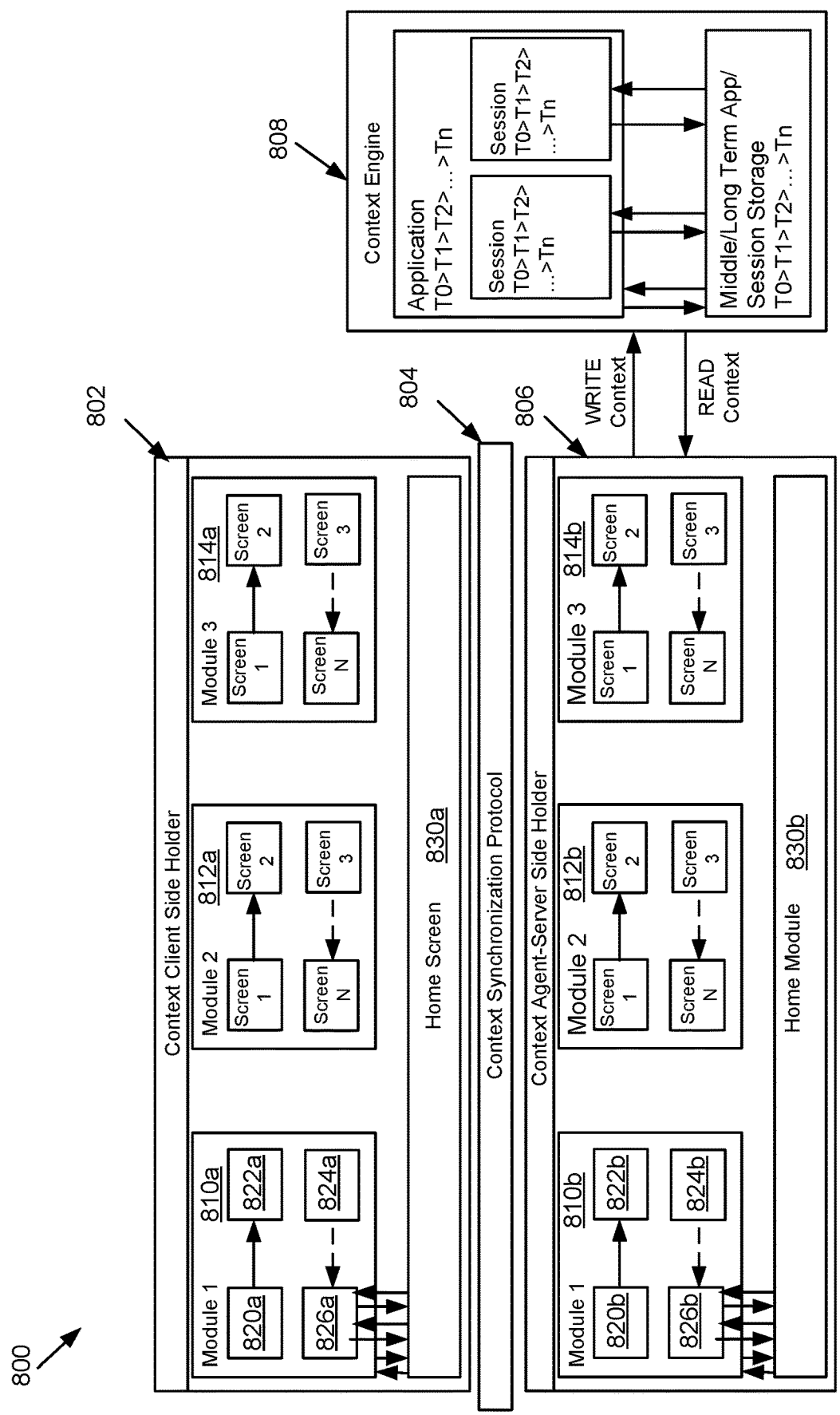
FIG. 8 is block diagram of an example of managing a context in the voice and connection platform according to one embodiment.

Referring now to FIG. 8, a schematic 800 providing further detail regarding the synchronization of context between client-side and server-side is shown according to one embodiment. In the illustrated embodiment, the client-side context holder 324 of the client device maintains one or more contexts 810a/812a/814a of the client device 106. In one embodiment, each context 810a/812a/814a is associated with a module. In one embodiment, the client-side context holder 324 maintains a context that includes the screens (Screen 1 thru N) that comprise the user's flow through the application's functionality and the functions available on each screen. For example, in the illustrated embodiment, the user was presented Screen 1 820a, which provided a set of functionality and the user selected a function (from F1-Fn of Screen 1). The user was then presented Screen 2 where the user selected a function (from F1-Fn of Screen 2). The user was then presented Screen 3 where the user selected a function (from F1-Fn of Screen 3) and so on. For example, in one embodiment, assume Module 1 810a is the module for a phone application and Module 2 812a is a module for a media application; in one embodiment, screens 820a, 822a, 824a and 826a of Module 1 810a may represent the user's dialog with the system to navigate a work around (discussed below) in order to select a contact and place a call and the screens of Module 2 812a may represent the flow of a user navigating a genre, artist, album and track to be played.

The Home Screen 830a resets the contexts of the various modules 810a, 812a, 814a. For example, assume that Module 1 810 is associated with a news application; in one embodiment, the user is directed to a home screen 830a (e.g. automatically by a mechanism such as a time out period or based on a user's request). In one embodiment, when the user is directed to the Home Screen 830a a reset of context information in one or more of the modules 810a, 812a, 814a is triggered.

In one embodiment, the context synchronization protocol 804, which is also described below with reference to FIG. 4, provides a protocol for communicating the contexts from the client-side context holder 324 to the context agent 422 also referred to as the server-side context holder or similar. In some embodiments, the context synchronization protocol provides a high degree of compression. In some embodiments, the context synchronization protocol provides a mechanism for verifying that contexts are successfully synchronized between the client and server sides such that the information 806 of the context agent 422 is identical to that 802 of the client-side context holder 324.

In one embodiment, the context engine 424 collects the contexts from the context agent 422. In one embodiment, the context engine 424 manages context information 808 for a user. For example, the context agent 424 maintains context information (e.g. long term and middle term contexts) for an application over time and the various context information for each user session in an application. Such information may be useful for machine learning (e.g. predicting a user's intent based on present context such as a requested to call Victoria and past contexts such as the last request for a Victoria being for a Victoria P.

In one embodiment, the client-side context holder 324 passes the context to one or more components of the system 100 including, e.g., the natural language understanding (NLU) engine 326 and/or the context agent 422. In one embodiment, the client-side context holder 324 stores the context in the storage device 241 (or any other non-transitory storage medium communicatively accessible). The other components of the system 100 including, e.g., the natural language understanding engine 326 and/or the context agent 422, can retrieve the context by accessing the storage device 241 (or other non-transitory storage medium).

The natural language understanding (NLU) engine 326 includes code and routines for receiving the output of the ASR engine 111 and determining a user's intended request based on the output of the ASR engine 111. In one embodiment, the NLU engine 326 is a set of instructions executable by the processor 202. In another embodiment, the NLU engine 326 is stored in the memory 204 and is accessible and executable by the processor 202. In either embodiment, the NLU engine 326 is adapted for cooperation and communication with the processor 202, the ASR engine 111 and other components of the system 100.

In one embodiment, the NLU engine 326 preprocesses the ASR engine 111 output to correct an error in the speech recognition. For clarity and convenience, the output of the ASR engine 111 is occasionally referred to as the "recognized speech." In one embodiment, the NLU engine 326 preprocess the recognized speech to correct any errors in the recognized speech. In one embodiment, the NLU engine 326 receives the recognized speech and, optionally, the associated confidences from the ASR engine 111 and receives a context from the client-side context holder 324 and corrects any misrecognized terms in the recognized speech. For example, assume the user speaks French and the voice input is "donne-moi l'information technologique" (i.e. "give me information technology"); however, the ASR engine 111 outputs "Benoit la formation technologique" (i.e. "Benoit technology training") as recognized speech. In one embodiment, the NLU engine 326 performs preprocessing based on context to correct "Benoit" to "donne-moi" and "formation" to "information," thereby increasing the accuracy of the NLU engine's 326 subsequently determined user intent.

The NLU engine 326 determines the user's intent based on the recognized speech from the ASR engine 111, which may optionally be preprocessed in some embodiments. In one embodiment, the NLU engine 326 determines a user's intent as a tuple. In one embodiment, a tuple includes an action (e.g. a function to be performed) and an actor (e.g. a module that performs the function). However, in some embodiments, the tuple may include additional or different information. For example, assume the NLU engine 326 receives the recognized speech "Call Greg;" in one embodiment, the NLU engine 326 determines a tuple includes an action (i.e. to place a call), actor (i.e. a phone module) and an entity, also occasionally referred to as an "item," (i.e. Greg as the recipient/target of the call).

In one embodiment, the NLU engine 326 detects one or more of a keyword or short cut. A keyword is a word that gives access directly to a module. For example, when the user says "phone" the phone module is accessed and the phone application is launched (or brought to the foreground). A shortcut is a phrase (e.g. send a message). Examples of keywords and shortcuts may be found in a table 710 of FIG. 7. In some embodiments, the system 100 creates one or more shortcuts based on machine learning, which may be referred to as intent learning. For example, in one embodiment, the system 100 learns that "send Louis a message" should be interpreted by the NLU engine 326 as the user 112 requesting to dictate and send an e-mail (rather than, e.g., an SMS text message) to a contact Louis Monier and proceed directly to an interface to receive voice input dictating the e-mail and established "send Louis a message" as a shortcut.

In one embodiment, the natural language understanding functionality of the NLU engine 326 is modular and the system 100 is agnostic as to the module that performs the natural language understanding. In some embodiments, the modularity allows the NLU module of the NLU engine 326 to be updated frequently to continuously improve accurate understanding or to swap natural language understanding module as new, more accurate natural language understanding systems become available.

When the NLU engine 326 cannot determine the user's intended request (e.g. the request is ambiguous, does not make sense, or the requested action and or action are not available or compatible, a value is missing from the tuple, etc.), the NLU engine 326 initiates a work around. For example, when the user's request is incomplete (e.g. a tuple is not complete), the NLU engine 326 requests that the work around engine 328 (discussed below) prompt the user for additional information. For example, when the user requests "what's on TV?" in one embodiment, the NLU engine 326 determines that a channel and a time are missing and initiates a work around.

In one embodiment, the NLU engine 326 passes a tuple to the connectivity engine 330. For example, the NLU engine 326 is communicatively coupled to a connectivity engine 330 to send the tuple to the connectivity engine 330. In another embodiment, the NLU engine 326 stores the tuple in the storage device 241 (or any other non-transitory storage medium communicatively accessible), and the connectivity engine 330 may be retrieved by accessing the storage device 241 (or other non-transitory storage medium).

In one embodiment, the NLU engine 326 passes a request for additional information to the work around engine 328. For example, the NLU engine 326 is communicatively coupled to the work around engine 328 to send the request for additional information to the work around engine 328. In another embodiment, the NLU engine 326 stores the request for additional information in the storage device 241 (or any other non-transitory storage medium communicatively accessible), and the work around engine 328 retrieves the request for additional information by accessing the storage device 241 (or other non-transitory storage medium).

The work around engine 328 includes code and routines for generating a request for additional information from the user so the NLU engine 326 is able to determine the user's intended request. In one embodiment, the work around engine 328 is a set of instructions executable by the processor 202. In another embodiment, the work around engine 328 is stored in the memory 204 and is accessible and executable by the processor 202. In either embodiment, the work around engine 328 is adapted for cooperation and communication with the processor 202, other components of the server-side connection engine 124 and other components of the system 100.

The work around engine 328 generates a request for additional information so the user's intended request may be understood and executed. In one embodiment, the work around engine 328 generates one or more requests for additional information thereby creating a dialog with the user in order to obtain the additional information. For example, the work around engine 328 generates a request for additional information and sends that request for presentation to the user 112 via the client device (e.g. sends the request to the text to speech engine 111, which presents the request to the user as audio output and/or for display on the client device's display). The user's response is received (e.g. as audio input received by the ASR engine 111 or through another user input device such as a keyboard or touch screen). The NLU engine 326 determines the user's intended request. When the NLU engine 326 still cannot determine the user's intended request, the work around engine 328 generates another request and the process is repeated.

Examples of types of requests for additional information may include, but are not limited to, one or more of a request for whether proposed information is correct, a request for the user to repeat the original request in whole, a request for the user to clarify a portion of the original request, a request for the user to select from a list of options, etc. For clarity and convenience it may be beneficial to discuss the operation of the work around engine 328 in the context of the following scenario. Assume the user requests "navigate to 1234 Fake Street, Any Town, Calif." However, for whatever reason (e.g. because of background noise, an accent of the user, an error in the speech recognition), the NLU engine 326 understood "navigate" and "California," so the NLU engine 326 does not understand the user's intended request.

In some embodiments, the work around engine 328 generates a request for whether proposed information is correct. In some embodiments, the system 100 proposes additional information based on machine learning. For example, assume that the system learns the user drives to 1234 Fake Street, Any Town, Calif. each Wednesday; in one embodiment, the work around engine 328 proposes additional information "You said California. Did you want to go to 1234 Fake St., Any Town?" In one embodiment, if the user says "yes," the tuple is complete and navigation to the full address is performed and if the user replies with a "no," the work around engine 328 generates another request (e.g. a request for the user to select from a list of options or spell out the destination).

In some embodiments, the work around engine 328 generates a request for the user to repeat the original request in full. For example, the work around engine 328 generates the request "I'm sorry. I didn't understand. Will you repeat that?" and that request is presented (visually, audibly or both) to the user via the user device 106 and the user may repeat "navigate to 1234 Fake Street, Any Town, Calif." In one embodiment, the work around engine 328 does not generate a request for the user to repeat the original request and one of the other types of requests is used. In one embodiment, the work around engine 328 limits the number of times it will generate a request for the user to repeat the original request in full based on a predetermined threshold (e.g. 0 or 1). In one such embodiment, responsive to meeting the threshold, the work around engine 328 uses a different type of request for additional information (e.g. prompting the user to select from a list of options).

In some embodiments, the work around engine 328 generates a request for the user to repeat the original request in part or supply information missing from the original request. For example, assume the work around engine 328 determines that "navigate" and "California" were understood and determines that a street address and city are missing and generates the request "I'm sorry. What was the city in California and street address?" so that the user may supply the missing information (which was part of the original request). That request is presented (visually, audibly or both) to the user via the user device 106 and the user may state "1234 Fake Street, Any Town." In one embodiment, the work around engine 328 limits the number of times it will generate a request for the user to repeat the same portion of the original request based on a predetermined threshold (e.g. 0, 1 or 2). In one such embodiment, responsive to meeting the threshold, the work around engine 328 uses a different type of request for additional information (e.g. prompting the user to select from a list of options).

In some embodiments, the work around engine 328 generates a request for the user to select from a list of options, occasionally referred to as a "default list." For example, assume the work around engine 328 determines that "navigate" and "California" were understood and determines that a street address and city are missing and generates the request "What letter does the city of your destination begin with" and generates a list of options such as "A-E is 1, F-J is 2, . . . etc." That request is presented (visually, audibly or both) to the user via the user device 106 and the user may state or select "1" or may select by stating the content of the option "A through E." Since the NLU engine 326 still cannot determine the user's intended request from "navigate," and a California city that begins with a letter between 'a' and 'e' inclusive, the work around engine 328 generates another list of options such as "A is 1, B is 2, . . . etc." That request is presented (visually, audibly or both) to the user via the user device 106 and the user may state or select "1" or may select by the content of the option "A." The work around engine 328 may continue filtering options and generating requests with lists of filtered options until "Any Town" is identified as the city, "Fake Street" is identified as the street and "1234" is identified as the street number.

Depending on the embodiment, the options may be listed visually on the display of the client device, read to the user 112 via the client device 106 using text-to-speech or both. In one embodiment, list options are presented in groups (e.g. in groups of 3-5) at a time. For example, a list of eight options may be presented in two sets as a first set of four options, the user may request the next set by stating "next" and the second set of four options is presented. Limiting the number of options presented at once may reduce the chances the user will be overwhelmed and may enhance usability. In order to navigate lists of options divided into multiple sets, in one embodiment, a user may use commands such as "start" to go to the first set of the list, "end" to go to the end of the list, "next" to go to a next set in the list, and "previous" to go to the previous set in list or "got to _____" (e.g. "go to the letter V") to navigate or filter by letter.

In some embodiments, the dialog resulting from the requests of the work around engine 328 may transition between request types in any order. For example, in one embodiment, the work around engine 328 upon the user's selection of an option, the work around engine may prompt the user for the additional information without the list of options. For example, upon receiving/determining that "Any Town" is the city using the list of options as described above, the work around engine 328 generate the request "What is the name of the street in Any Town, Calif.?," the user may verbally respond with "Fake Street." If the response "Fake Street" is incomprehensible, in one embodiment, the work around engine 328 may request that the user repeat or may request that the user select from a list of options generated by the work around engine 328.

In some embodiments, the requests generated by the work around engine 328 are generated in order to minimize or eliminate a user's need to respond in the negative (e.g. to say "No"). For example, the work around engine 328 generates a list of options for the first letter of the city and requests that the user select the appropriate option rather than sending requests along the lines of "Does the California city start with the letter A?," which would be a yes in the instance of the above example, but such a request is likely to result in a no result in other instances.

It should be recognized that the above "navigate to 1234 Fake St . . . " example of a use case and that many other use cases exist. For example, assume the user requests "Call Greg" and the user has multiple contacts named Greg in the address book (e.g. Greg R., Greg S. Greg T.); in one embodiment, the work around engine 328 sends a request with a list of options "Which Greg would you like to call? Greg R. is 1. Greg S. is 2. Greg T. is 3." and the user may speak the numeral associated with the desired Greg.

Furthermore, while in the above examples, a portion of the original request was understandable by the NLU engine 326 the actor (i.e. navigation application and phone application, respectively) and a portion of the entity (i.e. California and Greg, respectively), the work around engine 328 may operate when the original request in its entirety was not understandable by the NLU engine 326 or when other portions of a tuple are missing. For example, the work around engine 328 may make one or more requests to obtain the desired actor (e.g. the application the user wants to use), the desired action (e.g. a function or feature of the application), the desired entity (e.g. a target of the action, a recipient of the action, an input for the action, etc.). In one embodiment, the work around engine 328 generates requests at the request of the NLU engine 326 or until the NLU engine 326 has a complete tuple representing the user's intended request. In another example, assume the NLU engine 326 understood the message, but does not understand the actor (e.g. which service in a unified messaging client-email, SMS, Facebook, etc.—to use) and the entity (e.g. the recipient); in one embodiment, the work around engine 328 requests this additional information.

It should be the recognized that the features and functionality discussed above with reference to the work around engine 328 may beneficially provide an automatic troubleshooting mechanism by which the user's intended request may be determined and ultimately executed without the user needing to type out portions of the request (e.g. the user may speak and/or making simple selections via a touch screen or other input), which may be dangerous or illegal in some constrained operating environments (e.g. while driving) and thereby increase the safety of the user 112 and those around the user 112. It should further be recognized that the features and functionality discussed above with reference to the work around engine 328 may beneficially result in more user satisfaction as the system 100 is less likely to "give up" or push the user to a default such as a web search.

In one embodiment, the work around engine 328 passes the request for additional information to one or more of a text-to-speech engine 119 and a graphics engine for displaying content on a client device's display (not shown). In another embodiment, the work around engine 328 stores the request for additional information in the storage device 241 (or any other non-transitory storage medium communicatively accessible). The other components of the system 100 including, e.g., the text-to-speech engine 119 and/or a graphics engine (not shown), can retrieve the request for additional information and send it for presentation to the user 112 via the client device 106 by accessing the storage device 241 (or other non-transitory storage medium).

The connectivity engine 330 includes code and routines for processing the user's intended request. In one embodiment, the connectivity engine 330 is a set of instructions executable by the processor 202. In another embodiment, the connectivity engine 330 is stored in the memory 204 and is accessible and executable by the processor 202. In either embodiment, the connectivity engine 330 is adapted for cooperation and communication with the processor 202, other components of the client device 106 and other components of the system 100.

In one embodiment, the connectivity engine 330 includes a library of modules (not shown). A module may include a set of code and routines that exposes the functionality of an application. For example, a phone module exposes the functionality of a phone application (e.g. place call, receive a call, retrieve voicemail, access a contact list, etc.). In one embodiment, the module exposes the functionality of an application (e.g. a phone application) so that the user may access such functionality on a client device (e.g. a phone) through another client device 106 (e.g. a car). In some embodiments, certain features and functionalities may require the presence of a specific device or device type. For example, in some embodiments, phone or SMS text functionality may not be available through a car unless the car is communicatively coupled with a phone. The library of modules and the modular nature of the modules may facilitate easy updating as applications are updated or as it becomes desirable for the voice and connection engine to interface with new applications.

In some embodiments, when the functionality that will takes a long time to complete (e.g. generating a long report), the agent/assistant will inform the user when the functionality is finished (e.g. TTS, email, SMS text, etc.). In one such embodiment, the system 100 determines the quickest way to get in touch, for example, the system determines the user is logged into Facebook and sends the user a Facebook message stating that the functionality is complete.

In one embodiment, the voice assistant of the system 100 includes one or more modules for interacting with one or more other voice assistants (e.g. Apple's Siri, Microsoft's Cortana, Google's Google Now, etc.). For example, in one embodiment, responsive to the user providing voice input including a shortcut or keyword such as "Search Google Now for X" or "Ask Siri Y," the connectivity module 330 selects the module 330 for connecting to and interacting with Google Now or Siri, respectively, and forwards the query to that voice assistant. In one embodiment, the voice and connection engine 109/124 may monitor the voice inputs for a wake-up word that triggers the personal assistant of the system 100 to resume control of the flow of the user experience (e.g. to resume a dialogue or provide functionality and assistance). Such an embodiment, beneficially allows an entity operating the system 100 to provide its customers access to other voice assistants and their features. For example, a car manufacturer may beneficially allow a customer access the voice assistant of that customer's mobile phone (e.g. Siri when the customer uses an iPhone) or supplement the customers voice assistant options with another voice assistant (e.g. provide access to Google Now and/or Cortana when the customer uses an iPhone).

The connectivity engine 330 processes the user's intended request. In one embodiment, the connectivity engine 330 receives the tuple from the NLU engine 326, determines a module (e.g. phone module) based on the actor (phone) in the tuple and provides the action (e.g. call) and entity/item of the tuple (e.g. Greg) to the determined module and the module causes the actor application to perform the action using the entity/item (e.g. causes the phone application to call Greg).

Example Server-Side Voice and Connection Engine 124

Referring now to FIG. 4, the server-side voice and connection engine 124 is shown in more detail according to one embodiment. In the illustrated embodiment, the server-side voice and connection engine 124 comprises a context agent 422, a context engine 424 and a federation engine 426. It will be recognized that the components 422, 424, 426 comprised in the server-side voice and connection engine 124 are not necessarily all on the same voice and connection server 122. In one embodiment, the modules 422, 424, 426 and/or their functionality are distributed across multiple voice and connection servers 122.

The context agent 422 includes code and routines for synchronizing the context between the client device 106 and the voice and connection server 122 and maintaining synchronization. In one embodiment, the context agent 422 is a set of instructions executable by the processor 202. In another embodiment, the context agent 422 is stored in the memory 204 and is accessible and executable by the processor 202. In either embodiment, the context agent 422 is adapted for cooperation and communication with the processor 202, other components of the voice and connection server 122 (e.g. via bus 206), other components of the system 100 (e.g. client devices 106 via communications unit 208), and other components of the server-side voice and connection engine 124.

As discussed above with reference to the client-side context holder 324, the context agent 422 operates as the server-side context holder and is synchronized with the client side context holder 324. In one embodiment, if the client-side and server-side contexts are not identical the client-side supersedes. The client-side superseding the server-side may be beneficial because the client-side interacts more directly with the user 112 and, therefore, may be more likely to have a more accurate real-time data (e.g. location, luminosity, local time, temperature, speed, etc.) for defining the context since, for example, the associated sensors are located at the client device 106 and network 102 reliability may affect the server-side's ability to maintain an accurate and up-to-date context.

In one embodiment, the context agent 422 passes the current context to the context engine 424. For example the context agent is communicatively coupled to the context engine 424 to send the current context. In one embodiment, the context agent 422 stores the current context in the storage device 241 (or any other non-transitory storage medium communicatively accessible) and the context engine 424 can retrieve the current context by accessing the storage device 241 (or other non-transitory storage medium).

The context engine 424 includes code and routines for generating and maintaining one or more contexts. In one embodiment, the context engine 424 is a set of instructions executable by the processor 202. In another embodiment, the context engine 424 is stored in the memory 204 and is accessible and executable by the processor 202. In either embodiment, the context engine 424 is adapted for cooperation and communication with the processor 202, other components of the server-side voice and connection platform 124 and other components of the system.

In one embodiment, the context engine 424 archives the current context in order to create a history of contexts. Such an embodiment, may be used in conjunction with machine learning to recognize patterns or habits, predict a next step in a workflow, etc. to inform the understanding of the NLU engine 326 or proactively initiate a dialogue. For example, assume user x is a closed profile from a group of user type X; in one embodiment, the context engine 424 detects the difference between x and all others in the group to catch a particular behavior, habit, query, . . . and create proactivity to the user. For example, assume the user is asking for a theater and the context engine 424 detects the other users in the same group like a particular Japanese restaurant; in one embodiment, the system 100 proactively propose that the user to book a reservation at that Japanese restaurant after the feature because the system 100 detected in the schedule of the user that he'll not have time before the movie. In some embodiments, the system 100 may access an API from the restaurant menu (some websites provide this kind of API). The system 100 may understand that the menu or daily specials fit well with the preference of the user and directly read, in the answer of the agent, the menu or daily special to catch the attention of the user.

The federation engine 426 includes code and routines for managing one or more of a user's accounts and client devices 106. In one embodiment, the federation engine 426 is a set of instructions executable by the processor 202. In another embodiment, the federation engine 426 is stored in the memory 204 and is accessible and executable by the processor 202. In either embodiment, the federation engine 426 is adapted for cooperation and communication with the processor 202, other components of the application server 122 and other components of the development application 124.

In one embodiment, the federation engine 426 manages a unified identity. A unified identity may include, but is not limited to, one or more of a user's accounts (e.g. Facebook, Google+, Twitter, etc.), the user's client devices 106 (e.g. tablet, mobile phone, TV, car, etc.), previous voice inputs and dialogues, etc. in order to enhance user experience based on the user's social networks and/or habits. A unified identity provides aggregated information about the user, which may enhance features and functionality of the system 100. For example, assume the user 112 provides the input "I need gas." In one embodiment, the access to the aggregated data of the unified identity may allow the system 100 to understand that the user's intended request is for directions to a gas station and that gas station should be on the user's way to a favorite bar (e.g. to a brand of gas station to which the user is loyal, that has the lowest gas price, that is in the direction of travel along the way to the bar even if there's a closer gas station behind the user or closer but out of the way from where the system 100 determines the user is heading because it is after 6 pm on a Friday and the aggregated data indicates that the user heads to a favorite bar after work on Friday). In another example, the system 100 may use aggregated data to select and direct a user to a particular restaurant (e.g. based on aggregated data such as previous reservations made using a service like open table, the user's restaurant reviews on yelp, and previous voice queries and dialogues between the user 112 and the system 100 regarding food).

The federation engine 426 manages the user's devices to coordinate a user's transition from one client device 106 to another. For example, assume the user 112 via the user's tablet (i.e. a client device 106) has requested today's headlines and the system 100 begins reading the headlines to the user 112. Also assume that the user 112 then realizes he/she is going to be late for work and requests cessation of the reading of headlines. In one embodiment, the federation engine 426 manages the user's transition from the tablet to the user's automobile (i.e. another client device 106), so that the user 112, once in the car may request that the system 100 continue and the system 100 will continue reading the headlines from where it left off with the tablet. The federation engine 426 may also propose and manage a transition to the user's mobile phone (i.e. yet another client device 106) when the user arrives at work. Such embodiments, beneficially provide continuity of service, or "continuous service," from one client device 106 to another. In another example, the user may plan a road trip via a tablet on the sofa and have the route mapped in the navigation system of the car. In one embodiment, the system 100 may recognize that the user has a habit of reviewing headlines prior to work and continuing in the car on the way to work and may prompt the user on the tablet when it is time to leave for work (perhaps based on real-time traffic condition data) and ask whether the user would like to resume the headlines in the car.

In one embodiment, the federation engine 426 passes a context from one client device 106 to another in order to manage a transition to the recipient device. For example, the federation engine 426 is communicatively coupled to the client-side context holder 324 of the recipient device. In another embodiment, the federation engine 426 stores the current context in the storage device 241 of the server 122 (or any other non-transitory storage medium communicatively accessible) and the client-side context holder 324 of the recipient device 106 may retrieve the current context by accessing the storage device 241 (or other non-transitory storage medium).

Example Methods

Figure 5:
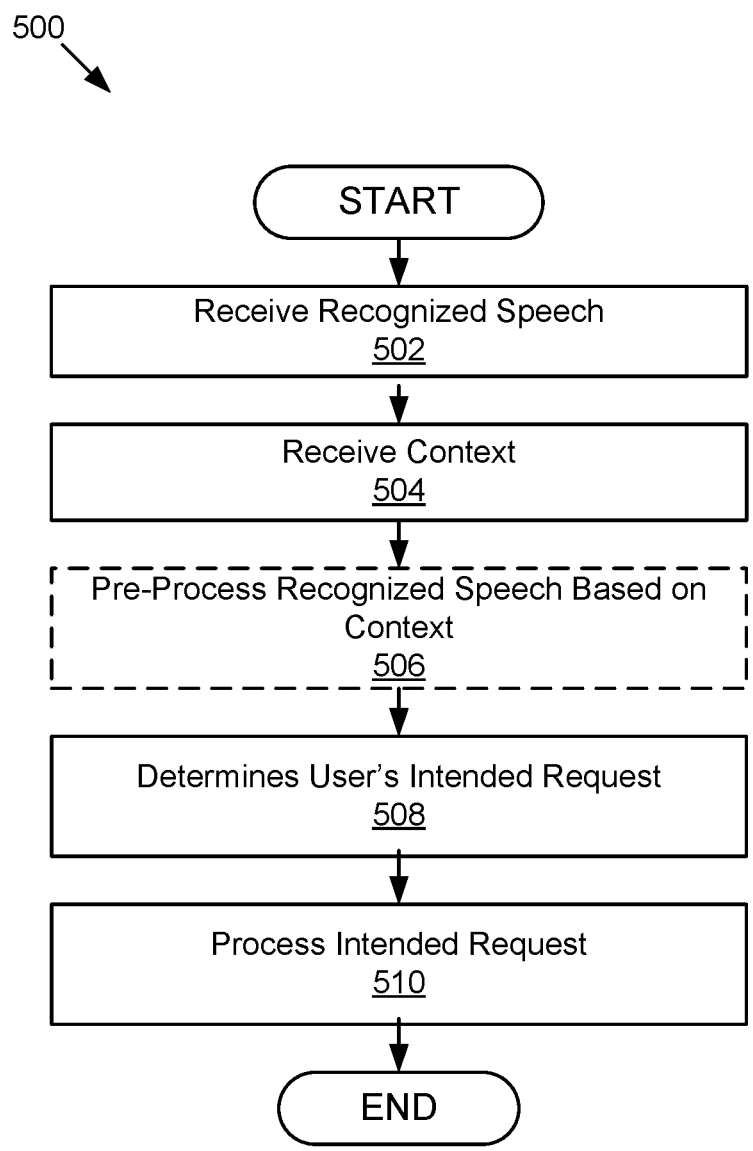
FIG. 5 is a flowchart of an example method for receiving and processing a request using the voice and connection platform according to some embodiments.
Figure 6:
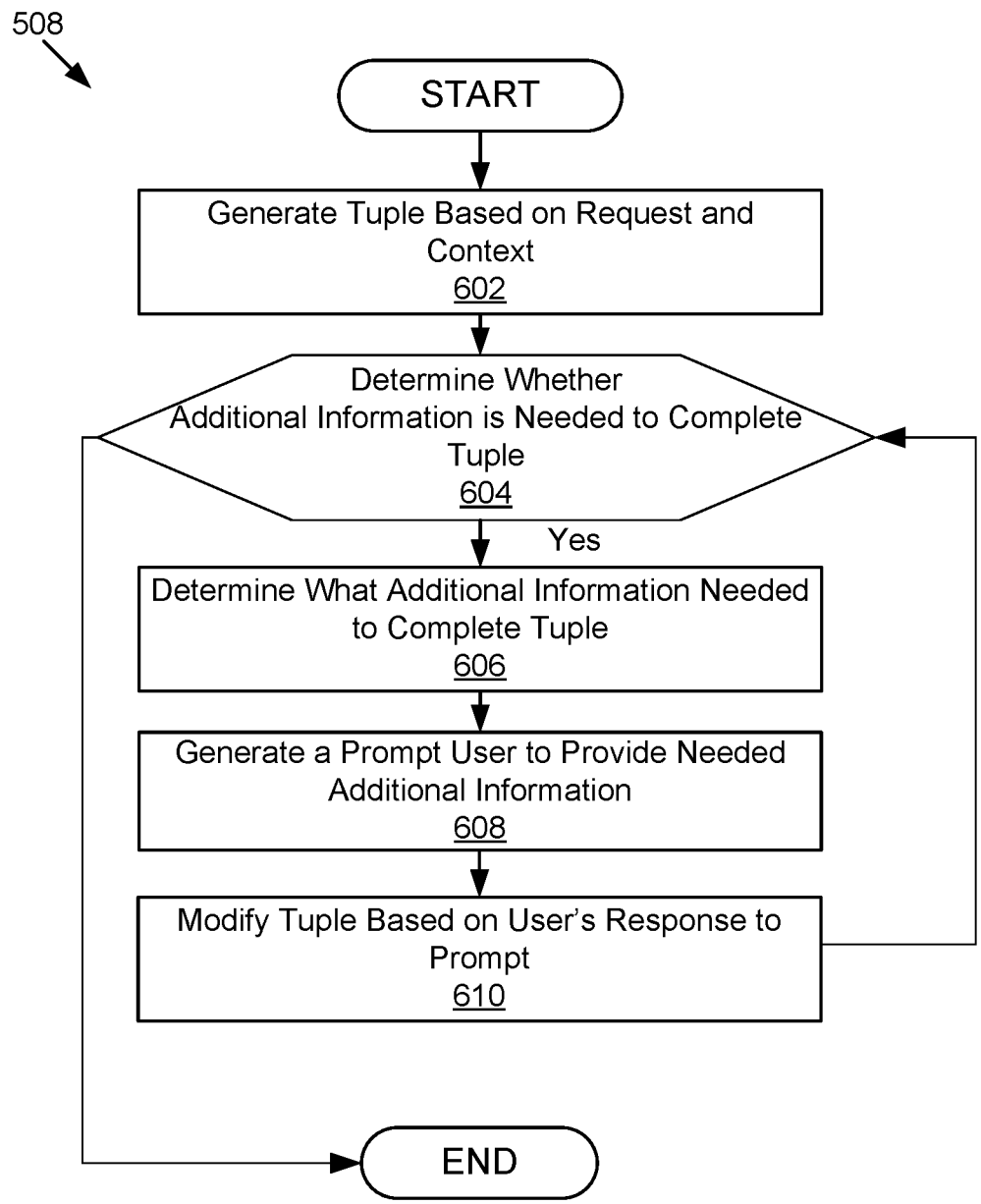
FIG. 6 is a flowchart of an example method for obtaining additional information to determine a user's intended request according to some embodiments.
Figure 7:
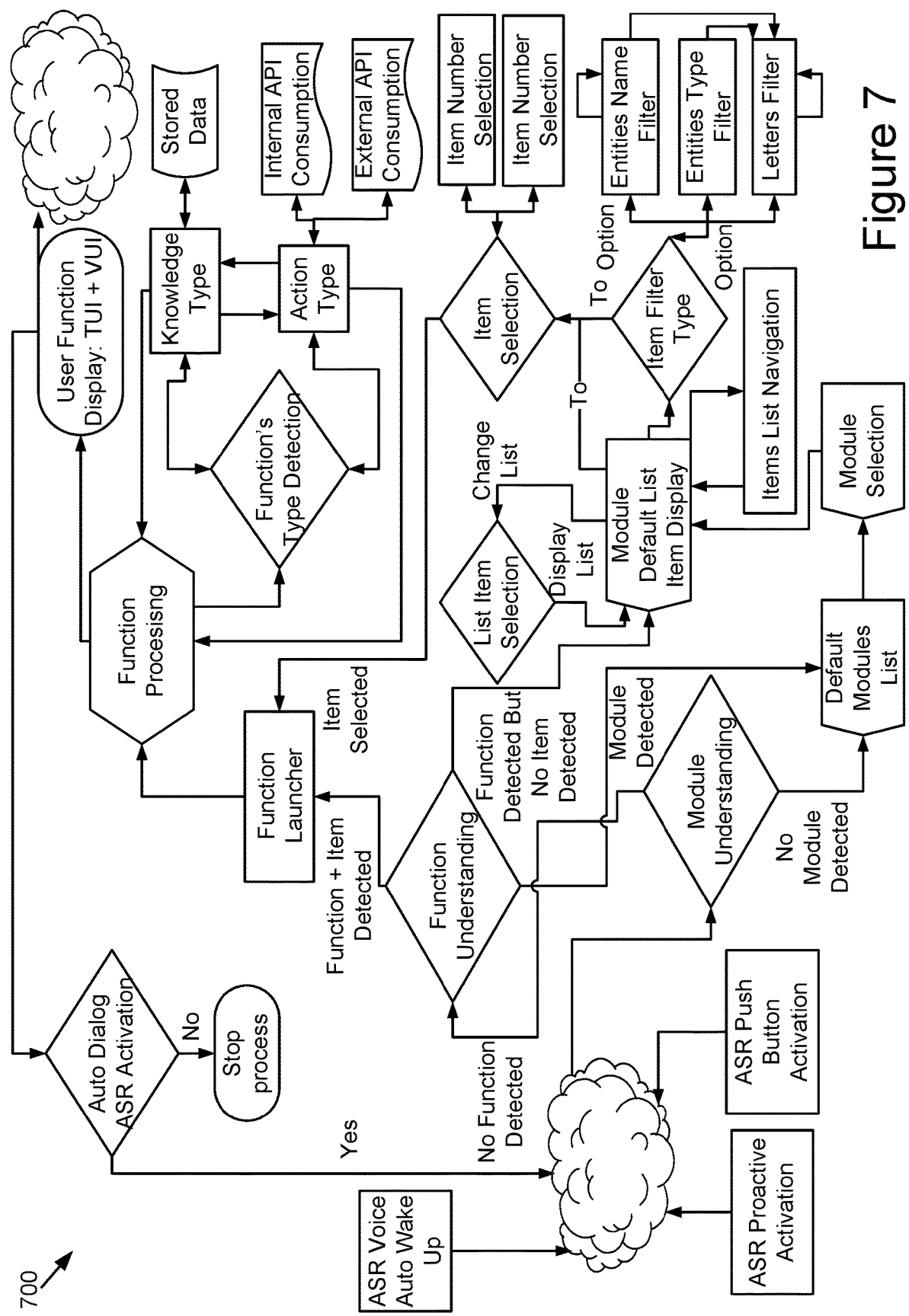
FIG. 7 is an example method for receiving and processing a request using the voice and connection platform according to another embodiment.

FIGS. 5, 6 and 7 depict various methods 500, 508, 700 performed by the system described above in reference to FIGS. 1-4.

Referring to FIG. 5, an example method 500 for receiving and processing a request using the voice and connection platform according to one embodiment is shown. At block 502, the NLU engine 326 receives recognized speech. At block 504, the NLU engine 326 receives context. At block 506, the NLU engine 326 optionally pre-processes the recognized speech based on the context received at block

504. At block 508, the NLU engine 326 determines the user's intended request. At block 510, the connectivity engine processes the intended request and the method 500 ends.

Referring to FIG. 6 an example method 508 for determining a user's intended request according to one embodiment is shown. At block 602, the NLU engine 326 generates a tuple based on a user's request and context. At block 604, the NLU engine 326 determines whether additional information is needed to complete the tuple. When the NLU engine 326 determines that additional information is not needed to complete the tuple (604—No), the method 508 ends. When the NLU engine 326 determines that additional information is needed to complete the tuple (604—Yes), the method 508 continues at block 606.

At block 606, the work around engine 328 determines what additional information is needed to complete the tuple and, at block 608, generates a prompt for the user to provide the needed additional information. At block 610, the NLU engine 326 modifies the tuple based on the user's response to the prompt generated at block 610 and the method continues at block 604 and the blocks 604, 606, 608 and 610 are repeated until the NLU engine 326 determines that additional information is not needed to complete the tuple (604—No) and the method 508 ends.

Referring to FIG. 7, an example method 700 for receiving and processing a request using the voice and connection platform according to another embodiment is shown.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the engines, modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

Appendix A: Car Personal Assistant and GoPad

GoPad Project Summary
The GoPad is an accessory product that will generate Android device- and vehicle-user behavioral data by provide a safer and more convenient in-car Android device experience. The GoPad will more closely integrate select Android devices into vehicles. However, GoPad is not limited to integration with Android devices and may integrate with other devices (e.g. iOS, Windows, Fire, etc.)

The GoPad device is a hardware cradle that will be affixed to the dashboard of the user's vehicle near the windshield via a clip mechanism. It will provide the following features:

- An OBD2 Reader hardware device to capture and transmit vehicle information to systems for analysis and presentation to the user
- A Bluetooth radio and dual microphones in the cradle to provide hands-free capabilities in vehicles that lack built-in Bluetooth connectivity
- Hands-free mobile phone use, including voice dialing and control, with audio via an Aux-in connection to the vehicle stereo system
- Hands-free navigation, including voice initiation and voice control, with audio via an Aux-in connection to the vehicle stereo system
- Media playback with audio output to the car stereo via an AUX-in stereo connection
- Power to the Android device via USB (vehicle aux power port) for charging and use
- Intelligent agent assistance for all voice-controlled functions via the Voice and Connected platform
- Cloud-connected web service for intelligent agent, user data capture, and delivery of content via the Voice and Connected platform
- Driving efficiency and feedback features on the Android device to enhance the user's driving experience
- An optimized set of physical controls on the cradle to further enable eyes-free use of the Android device
- A simple app launcher mechanism to enable drivers to easily and safely launch the apps they want to use
- A simple Physical/Agent Controls API to allow $3^{rd}$ party software to take advantage of the cradle's physical buttons
- Hands-free incoming text message reading
- Hands-free Facebook activity reading Cradle Hardware

*Cradle Design*

Mechanical Design
The cradle will be designed in two parts: 1) a base cradle unit, and 2) a device-specific adapter. All main functionality will go into the base cradle unit, with the adapter providing only Android device-specific physical and electrical fit capabilities.

The physical form factor of the cradle should accommodate the device + adapter (securely), specified physical controls, and the cradle motherboard while minimizing size and bulk. The device should not be insertable backwards or upside down.

Cooling of the cradle electronics shall be passive with vents hidden from user view to the greatest extent possible or incorporated into the design.

Industrial Design

The overall design of the cradle should assist the user with completing actions with as little direct observation/interaction as possible. Buttons should have tactile differentiation, auditory/tactile cues should be used where appropriate, etc.

Cradle industrial design is TBD but a very high fit-and-finish level is required for public demonstration purposes. The cradle feels like an actual commercial product built to a luxury-goods level. The cradle does not feel out of place in a top-of-the-line Audi or Mercedes vehicle interior and matches these interiors in terms of materials quality and presentation.

Finish material explorations should include paint, machined metals, machined plastics, rubberized paints, etc.

*Physical Controls*

Buttons

The cradle will include a selection of physical controls (buttons) to aid eyes-free ease of use.

The following buttons are required:
- Agent button: Activate Voice Control, Activate App Launcher, Etc
- Forward button: Next Media Track, Phone Call End/Reject
- Back button: Previous Media Track, Phone Call Answer
- Play/Pause button: Play or Pause Media Playback, Phone Call Mute Buttons allow for multiple overloaded actions based on how they are used (single press, double press, long press, etc).

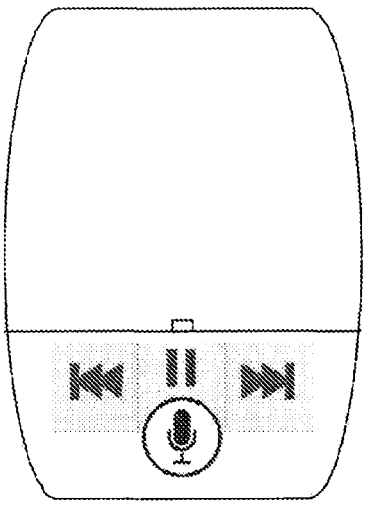

Lighting

Backlighting/highlighting of physical controls for use in low-light environments is required. The lighting/legends should behave as follows:
- Forward/Call End button: should use default lighting except when a phone call is active. When a call is active, the Call End legend should illuminate until the call is ended.
- Back/Call Answer: should use default lighting except when a phone call is incoming.
- Play/Pause,Mute: When a call is active, the Call Mute legend should illuminate. If the button is pressed, the call should enter Mute state and the Mute legend backlight should change to red to indicate mute status. Pressing the button again will toggle mute status and legend backlight color.

An unobtrusive and/or attractive pilot light to indicate cradle power-on is required.

*Upgradeable Firmware*

The cradle firmware is designed such that field upgrades can be performed under the control of the GoPad Android application running on the device.

A mechanism exists to recover from a corrupted firmware update, such as may result from the device being removed from the cradle during an update operation.

*USB Audio*

The cradle design may accommodate accepting USB audio from the device (when the device has that capability) and relaying it to the cradle line-out for playback via the car stereo Aux In.

*Power*

Maximum Power Supply

The cradle may be able to supply 2A at 5.1V to the device at all times, in addition to power needs of its own.

Device Charging

The cradle may supply sufficient power to each device such that it can add to its state of charge while the following functions are being used simultaneously:

- Hands-free phone call in progress
- Hands-free navigation in progress
- Media playback in progress (possibly paused)

*Unique Device and Version ID*

The cradle may support a unique device ID as well as both a hardware and firmware version number. The Android application may be able to read/query for these unique IDs.

*Cradle Logging*

The cradle may support activity logging for software development and debugging purposes. These logs mayt be accessible to the Android application.

Examples of items to log include, but are not limited to, the following: USB connection state, button presses, Bluetooth connection state, etc.

*Cables*
Required cables are:
- USB cable (for power)
- Stereo aux cable (for audio out)

*OBD2 Reader*

A hardware OBD2 Reader device is required. This device will collect vehicle information and upload it to OPI systems for analysis and subsequent presentation to the user.

The OBD2 Reader module will include a Bluetooth radio and collects information whenever the GoPad is in use. It transmits the information to the device, which subsequently uploads it to OPI systems for analysis.

An alternate OBD2 Reader module that includes a cellular radio which collects vehicle information whenever the vehicle I being driven, regardless of whether the GoPad is in use, is highly desired for future GoPad versions. This solution will be investigated in parallel with GoPad2 development. A 3$^{rd}$ party partner (OEM source) is desired.

*GoPad-based Hands-Free Capabilities*

For vehicles which lack native Bluetooth hands-free capabilities, the GoPad will provide such features. The following hardware components are required.

Dual Microphones

Dual microphones are required, along with echo cancellation and noise suppression technology. A very high level of audio quality is required. It is desired that the person on the remote end of the phone call be unable to determine that the user is speaking via an in-car hands-free device.

The audio quality benchmark device is the Plantronics Voyager Legend BT headset.

Bluetooth Radio

The GoPad cradle will include a Bluetooth Radio that supports Hands-Free Profile. The device will auto-connect to the cradle BT radio when it is inserted into the cradle and disconnect when removed. If the BT connection drops for any reason, the connection will be re-established immediately.

Android App Software – *One embodiment of a Release*

*Lightweight Launcher*

The Lightweight Launcher may activate automatically when the device is placed into the cradle. If active, it should deactivate when the phone is removed from the cradle. The initial setup experience should be as smooth as possible and require the minimum manual configuration by the user.

At first release, the Launcher gives access to the following functions:

- The default shortcuts bar :
    - Phone Calling
    - Messages : Text, Mails and Facebook messages
    - Navigation
    - Newscaster : General and Topics News + Facebook User Timeline
    - Media Playback : Local and online streaming Medias
- The Car Personal Assistant
- The Applications list
- The Vehicle module
- The GoPad Settings Upon insertion in the cradle, the Launcher will display the Splash screen for a short duration. It will then display the Lightweight Launcher Home screen and await user input.

A subsequent double-press of the Agent button, no matter which application is currently in the foreground, will bring up the Lightweight Launcher and allow the user to select a new function. If the GoPad app is already in the foreground, a double-press of the Agent button will return the user to the Home screen.

System Volume

The launcher will set audio output volume to a fixed level (TBD) and the user will adjust volume using the vehicle stereo volume control.

Screen brightness

When in the cradle, the device should be forced to automatic screen brightness control. This should revert to the user's setting when the device is removed from the cradle.

Physical Controls

The physical controls on the cradle will have the following functions depending on how they are used:

| Control | Single Click | Double Click | Click And Hold |
|---|---|---|---|
| Previous | • Previous Track (Media) <br> • Answer call (Phone) | | |
| Next | • Next Track (Media) <br> • End/Reject Call (Phone) | | |
| Play/Pause | • Play/Pause Toggle (Music) <br> • Mute Call (Phone) | • Media Player (GoPad) | |
| Agent | • Initiate/Cancel Agent | • Home Screen (GoPad) <br> • GoPad Launcher (3$^{rd}$ party apps) | |

The Car Personal Assistant

The Car Personal Assistant (Agent) is activated by single-pressing the Agent button. The Agent will respond vocally, indicating its Ready status.

1. 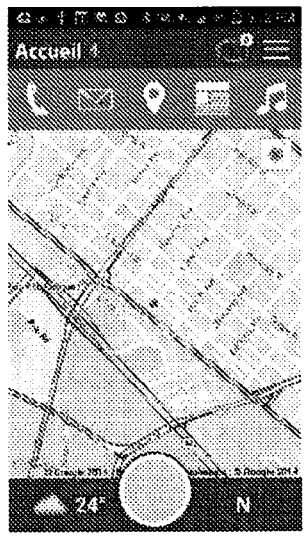 2.  3. 

The sequence behavior of the agent button is in 3 steps :
1. Waiting mode : the user need to press to the button to activate the voice recognition
2. Speaking mode : the agent is speaking a prompt to the user
3. Listening mode : the agent is listening the sentence of the user.

Functionality that the Agent will handle in this release is limited to:

- In-app navigation among feature categories (Phone, Messages, Navigation, Media, News/Facebook, Vehicle, Settings)
- Call answering/call rejecting/dialing from contacts/dialing from call history/dialing an arbitrary number. Since rejecting a call appears to not be supported by the API, we should cease ringing and clear the incoming-call display if the user opts to reject, then allow the call to naturally roll to voicemail as if the user didn't answer it (which is essentially what happened).
- Initiate/Cancel Navigation. Direct speak an address or indirect speak an address (by parts of the address : Country, Town, Street, ...), get an address from contacts, get an address from Location Favorites.
- Search for a local business ("Find me the nearest Starbucks") and initiate navigation to it.
  - Local business are find in Google Maps APIs or Yelp, a generic connector need to allow in the future the integration of any local business location source API.
- Play a local media. Playlists/Albums/Artists/Song/Shuffle.
  - Online media need to be integrate in a second version of the CPA : Spotify, Pandora,
- Vehicle Status Warnings (announcement only). Fuel low. Check Engine Light. Etc.
- Launching 3rd Party applications by name.
- Selecting and reading News categories
- Reading Facebook updates Disambiguation functionality to reduce multiple matches is required (see screens below).

*General User Experience: Voice & General Patterns*

General Patterns

The approach to build the voice scenarios of the application is based on the facts:
- The probability of the voice recognition is working is very limited
- The Agent need to limited the negative interactions
- The user need to give the less voice command possible to achieve the action he want to do.
- The performance of any interaction needs to be evaluating by the time to achieve and not by the ASR Confidence.

To be successful with this vision, the agent needs to use a intelligent combination of both types of scenarios: Direct Voice Patterns and Work-a-round Patterns.

Direct Voice Patterns

The direct voice patterns are usual in the domain of voice recognition. Their quality is validated by the confidence of the ASR and the confidence of the NLU (Natural Language Understanding).

In the case of the Phone module and the action of making a call, you can ask to "call Bastien Vidal" (unique contact with 1 phone number), the agent will directly find the contact and propose to the user the action to call Bastien Vidal.

The problem with the direct voice patterns is what it happens when you don't have a direct match with the voice query of the user or when you need more information from the user to achieve to a clear action.

Sample of case :
- I want to call a person with many phone number
- I want to send a message to a person with many phone number and email address
- The Address is wrong by the direct voice recognition and I cannot type anything (because driving)

Work-a-round Patterns (WAR)

The WAR Pattern is based on the fact that the Voice and Connected Platform allow the continue dialog between the Human and the Machine (after any round of question/answer, the agent will automatically launch the activation of the voice recognition button) and the creation of the Temporal Dialog Matrix Context (see below for the description of the TDMC).

The continue dialog allow the creation of different type of WAR Scenarios

- The List Items selection
  - In the case of any list with the navigation items step and the choice of a number
- The Frequence History proactivity
  - 
- The Step by step selection Each items screen of the application is based on a list item presentation with the properties :
- Each Item has a digit from 1 to 5
- Each item is read by the label with

General Items list presentation
- General List
  - Entity Filter
  - Alphabet Filter
- Alphabetical Numbers
- History Numbers History Frequency list presentation

*Splash Screen*
A splash screen that displays branding will be displayed briefly when the Android app launches and whenever the device is placed in the cradle.

*Login Screen*
The Launcher login screen will follow the splash screen when the phone is initially placed in the cradle for the first time or when the user has explicitly logged out from the Android application.

It will display branding and will offer login by username/password. A Create Account link will also be presented, allowing a user to create a new account if necessary via email a username/password or a Facebook account.

Login              Sign Up Options         Sign Up Screen

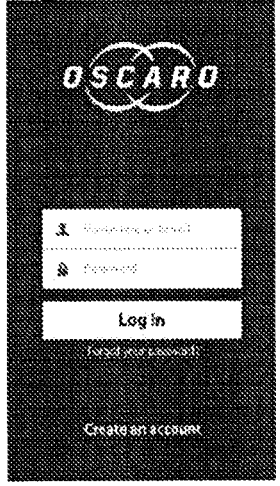

*Home Screen*
When the Home button is pressed or after the phone is placed in the cradle, the Home screen will display a map of the current location with shortcut buttons to major functions across the top as well as some status information across the bottom (temperature and compass direction). The top bar will also reflect status and notification information as appropriate.

Home Screen (Cradle)        Home Screen (No Cradle)

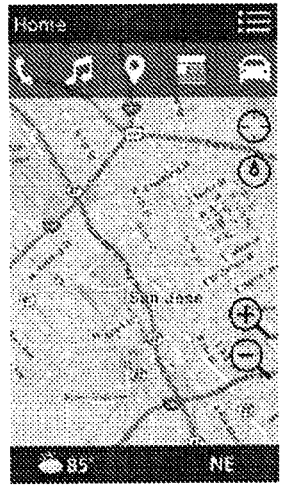
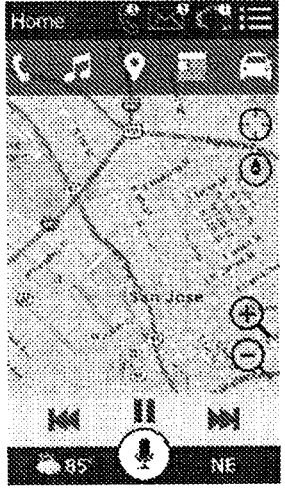

The Home Screen will display the following notifications:

- Missed calls
- Incoming messages
- Vehicle faults

*Phone*

GoPad will use the stock Android telephony APIs behind a custom GoPad phone UX.

Incoming Call Announcements

The Agent should read incoming call information (caller name if the caller is in Contacts, caller number otherwise) out loud, silencing the ringtone and pausing media playback if necessary, and then request user action. The user may respond via one of three methods:

- Vocally to accept the call or to reject the call and send it to voicemail.
- Via on-screen touch buttons to accept/reject the call
- Via the Previous Track/Accept Call or Next Track/Reject Call buttons Once the interaction has concluded, any paused media should be resumed.

From the touchscreen, incoming calls will be presented as follows:

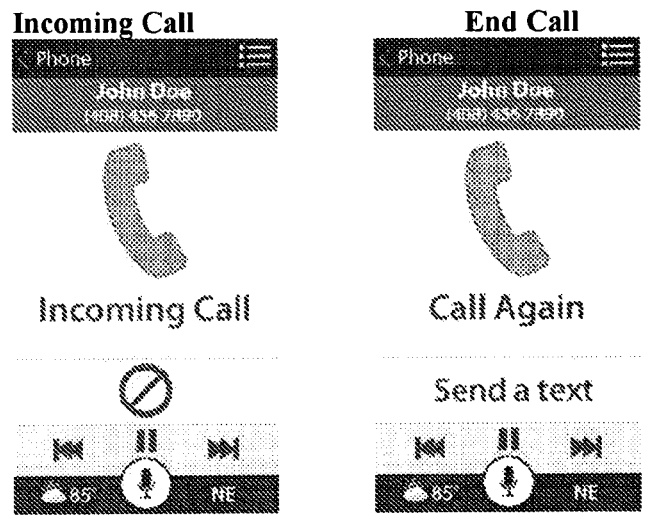

Outgoing Call

Outgoing calls may be initiated vocally by pressing the Agent button to wake the Agent, then speaking the dial command along with the number or contact name.

In the event that multiple numbers match a Contact name, the Agent will speak the numbered list of options sorted by contact recency (ie the number has called recently, has been called recently, etc) and then alphabetically. The user will then vocally select the option number to call. The Agent will place the call and update the recency value for that number.

Calls may be initiated via the phone touchscreen via the following methods:

Dial Pad    Favorites    Recents
 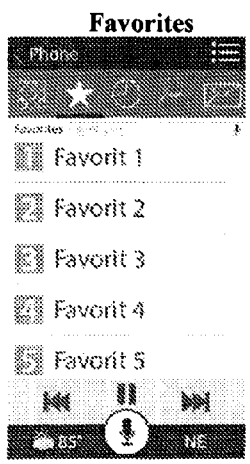 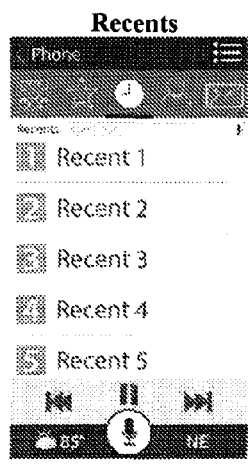
Contacts
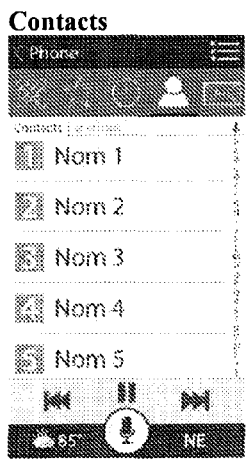
Call status display
All call status information will be handled by the status bar at the top of the screen (see Home Screen above).
*Audio Playback*
Media Playback
The Media Player will be used to play Android-native media files via the following selection categories:
- Artists
- Albums
- Playlists

| Artists | Albums | Playlists |
|---|---|---|
| 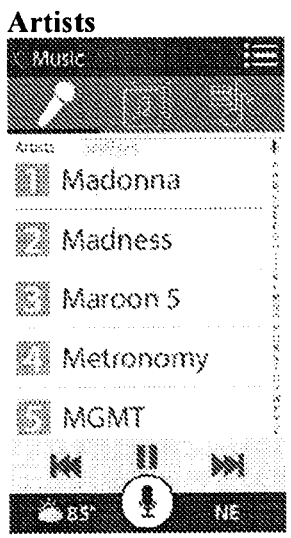 |  | 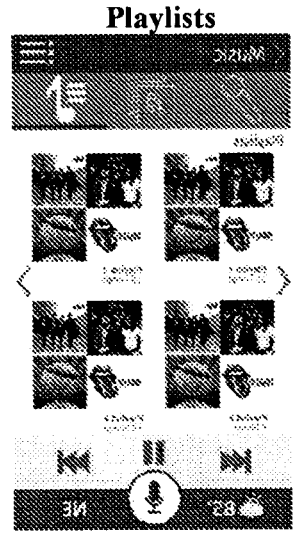 |

Fast selection of items in long lists will be facilitated by alphabetic skipping to subgroups of lists. For example:

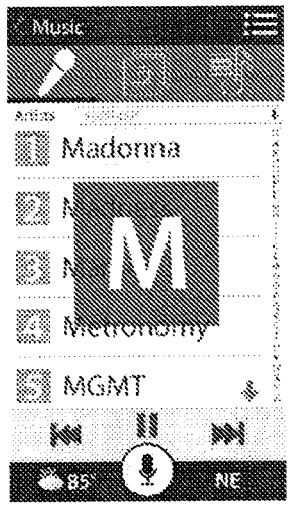

The alphabet list on the right border of the screen can be scrubbed with a fingertip for fast navigation.

The primary control for the Media Player will be via the Agent. When multiple matches are possible in a given category, the Agent will provide an on-screen numbered list and allow the user to select the match by number. For example:

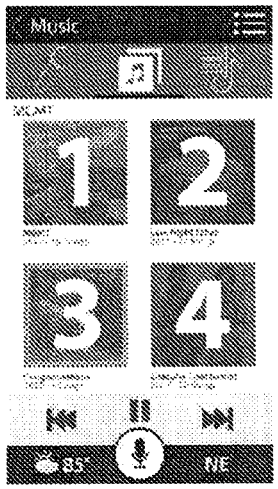

The Media Player will display Artist / Album / Song information while playing, along with album art if available. Elapsed and total time will be displayed. Space permitting, next track name may also be displayed.

Pressing the Previous, Next, and Play/Pause buttons on the cradle should affect playback, as appropriate.

The Media Player should play media files in the default location on the device (ie shared libraries from other media players should be accessible to the Media Player).

Since Playlists are media player-specific, the GoPad Media Player should import playlists from the following media player applications:

- Google Play Music
- Android Music App

Navigation

Basic Navigation

Navigation mechanics will be handled via the stock Android Google Navigation application. The LW Launcher and the Agent will provide a voice front-end to Google Nav that can be used to begin navigating to a destination by selecting one of the following:

- Favorites
- Recent Destinations
- Address Book contacts
- Arbitrary addresses ("333 West San Carlos, San Jose, California")

| Address Book Contacts | Favorites | Recents |
|---|---|---|
| 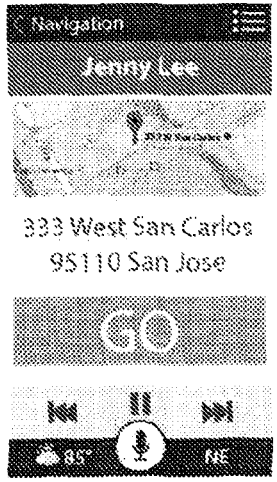 | 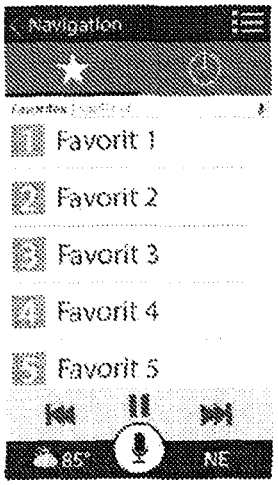 | 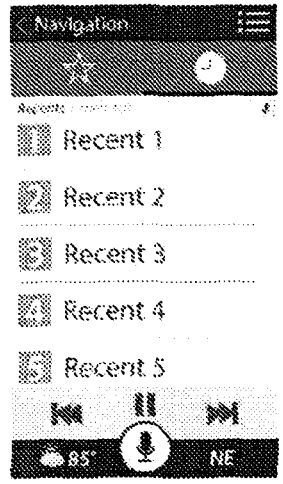 |

The Lightweight Launcher will initiate Google Nav and hand it a destination, at which point Google Nav will take over as the navigation provider.

The user may be able to return to the Launcher (or another application) and put the Navigation function in the background, without cancelling the Navigation function, and returning to it at a later time. The common methods to do this include double-pressing the Agent button to return to the Home screen or activating the Agent and requesting a new function.

*Incoming text message response*

The Agent should vocally notify the user that they have received a text message, including the sender's name if it's in the Address book, and give them the option to call them back or send an automated user-defined boilerplate response of the form "I am driving right now and will get back to you shortly."

Incoming Text Display

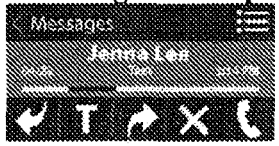

*Facebook Activity Reader*

The GoPad Facebook Activity Reader will be incorporated into the GoPad app. This feature will read Facebook wall posts to the user and provide a large button for Liking.

Facebook Activity

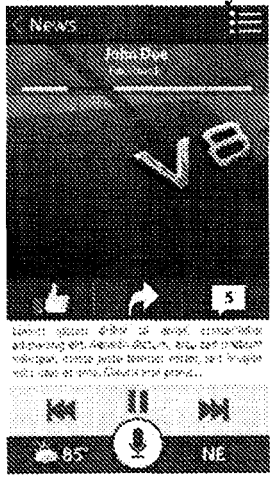

Incoming Facebook Messages will also be read, in much the same way incoming text messages are read. The user may send a boilerplate response to the sender.

Facebook Messages
*News Reader*
The GoPad application will include integrated news reading in the manner of Newscaster. It will support the following features:
- Favorites
- Recents
- News Categories (ie Tech, Sports, etc)
- Birthday reminders
Favorites       Recents       Categories
  
News stories will be presented in an easily-parsed format with a full-screen text alternate.

News Story

Full-Screen Text

*Vehicle Status/Efficiency*

Launching the Vehicle Status feature will display the following information based on data from the BT OBD reader:

- If the vehicle supports fuel level measurement via OBD, range in miles/km and time at current speed before a fuel fill-up is needed (this number should be conservative). This should be calculated over a TBD window of recent behavior. A work-around is highly desired for cars which fail to provide fuel tank fill status info via OBD.
- MPG this trip and running average of all trips
- An instantaneous driving efficiency display, which essentially measures acceleration/deceleration rates and graphically encourages the driver to be gentle with the accelerator and brake pedals, plus a historical display of how the driver has performed over time (perhaps plotted against EPA ratings of car?).
- Trip statistics, including elapsed trip time, efficiency during the trip, fuel used, etc.
- Reset button to set trip statistics to zero
- Upcoming maintenance needed (based on maintenance schedule info from the vehicle database), optimally translated into time (days) based on recent driving history.
- Fault Diagnostics error codes
- Vehicle security (unsafe vehicle behaviors, critical measures, etc).

Additionally, vocal alerts for the following high-priority scenarios should interrupt any other currently displayed function and the device screen should switch to the Vehicle Status page with an error display:

- Fuel Is Low (threshold TBD, may vary based on recent driving – see above). This is dependent on fuel-level reading capability (See above).
- Catastrophic vehicle error (error code list is TBD) requiring immediate driver action (ie "Pull over and shut off the engine as soon as it is safe to do so")

Vehicle Efficiency   Fault Diagnostics   Vehicle Security

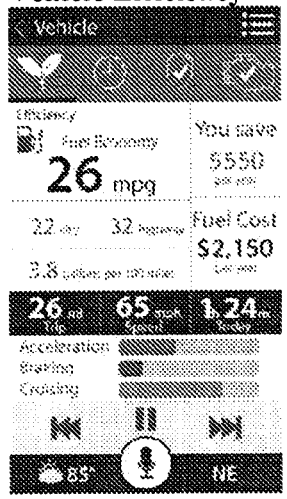  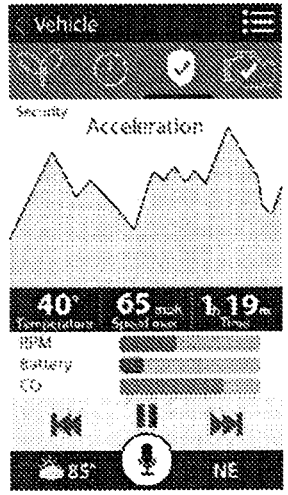

Vehicle Trip Info

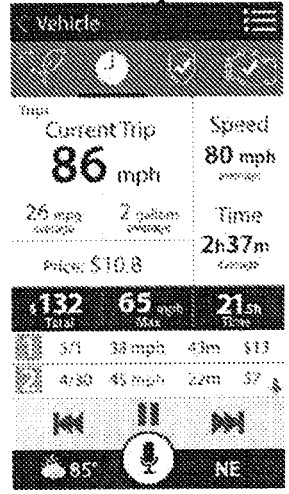

*3rd Party Applications*

The GoPad application will provide a quick and easy way to launch 3rd party Android applications that provide functionality that GoPad does not provide natively. The 3rd party app launcher will provide large touch targets to make application launching easy while driving the vehicle.

The list of applications presented will be configured by the user, who will pick from a list of all applications present on the device.

App Launcher Screen

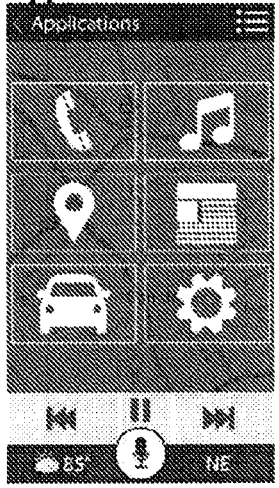

*Settings*

The Settings area is where users configure the GoPad application per their preferences. The final list of settings is TBD, but will include:

- Incoming text auto-response boilerplate
- Incoming Facebook Message auto-response boilerplate
- BT OBD2 adapter selection (from the list of paired BT OBD2 adapters)
- Engine displacement
- Engine type (gas or diesel)
- Measurement units (Imperial or Metric)

Settings

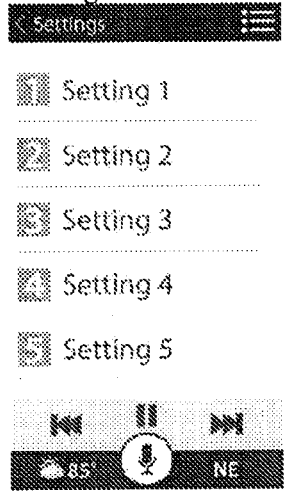

Vehicle identification

The ability to identify multiple vehicles/cradles is required. Items to track on a per vehicle/cradle basis include:

- License plate
- VIN (if OBD does not provide it)
- Cradle unique ID

*Bluetooth Pairing*

Cradle Pairing

The ability for the Launcher to automatically pair the device to a cradle when inserted into that cradle for the first time is required.

Pairing to existing vehicle HFP or A2DP is not a feature for this release and no support is required.

*Data Collection*

The following data should be collected and stored in the system:

- User name/email/phone #
- Car info
  - VIN #
  - License plate #
- Driving log (all entries time-stamped)
  - Car
    - Distance
    - Speed
    - Engine run time
    - Location(s)
    - Navigation destinations
  - Application
    - All user interactions should be logged for software refinement purposes
- Error code log
- Gas mileage

Data collection techniques

The easiest method of data collection for each piece or type of data should be employed. Where can provide the data on behalf of the user, it should do so (for example, if can determine the fuel tank size based on the VIN number, rather than asking the user for that information, it should do so).

The application should include camera capture of the license plate, from which the application can parse the plate number and use it to determine the VIN # and all additional attendant data.

Data anonymization

Certain types of collected data are interesting to only in the aggregate – it has no value in a user-specific form. Usability data of the application itself (ie patterns of button clicks, etc), of the sort collected by services such as Mixpanel, fall into this category. This data should be anonymized for data privacy reasons where practical.

*Software Update*
The Lightweight Launcher requires an OTA update mechanism to allow new software versions to be pushed out to devices in the field.

*Physical/Agent Controls API*
A simple software API that allows 3rd party app developers to respond to the cradle physical controls as well as to Agent commands while the device is in the cradle and their app is running in the foreground (or, in some cases, the background) is required.

This API should be as simple as possible.

Physical Controls
The Physical Controls API should allows for three command inputs (single press, double press, long press) for the following three buttons only:

- Previous Track
- Play/Pause
- Next Track

Access to the Agent button by 3rd Party Apps is not allowed.

Agent
The 3rd Party App may register to accept specific voice commands via simple API. Examples of commands may include:

- "Next track"
- "Previous track"
- "Pause"

Software UI Flow
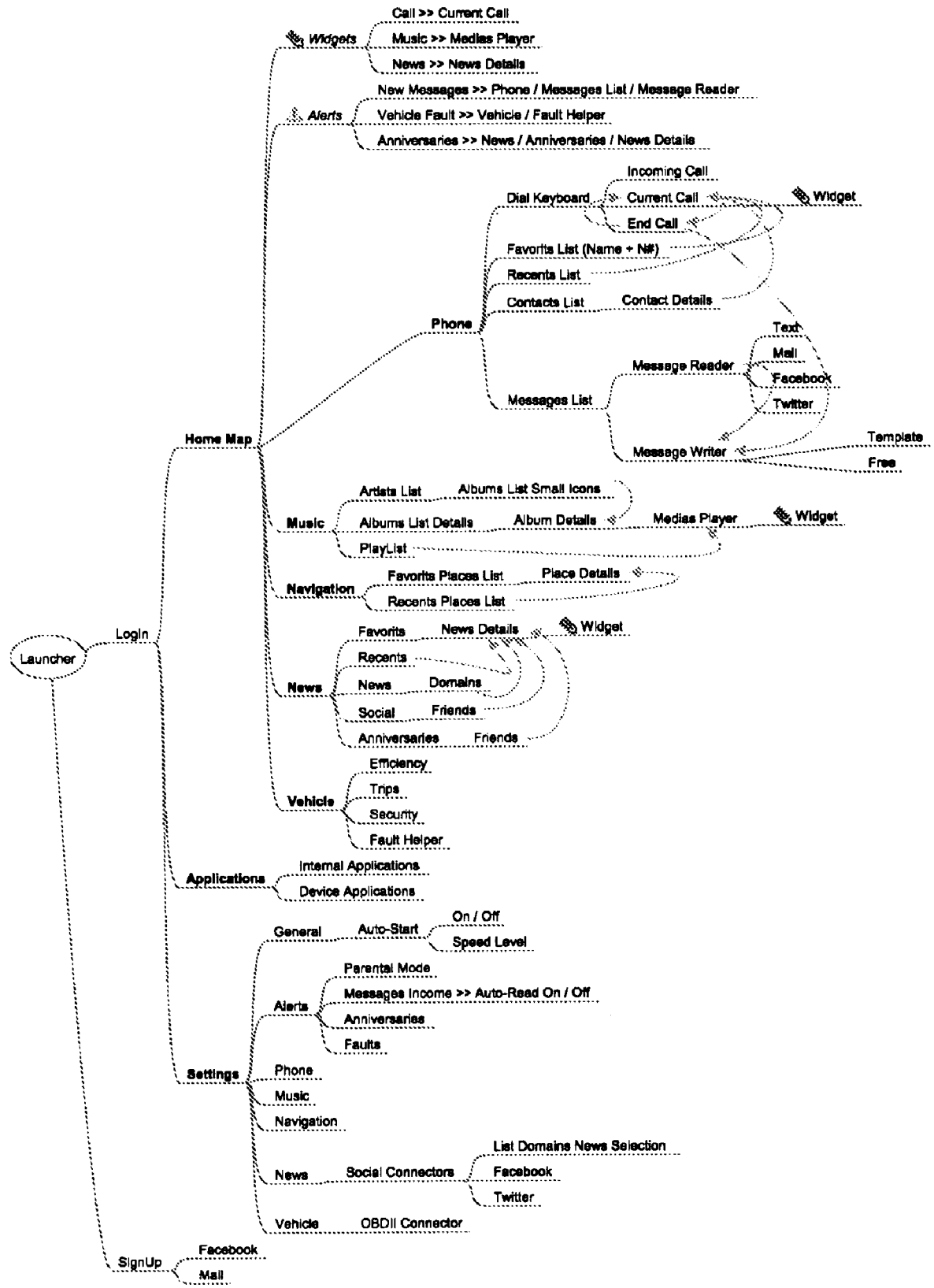

Market Opportunities

| Category | Capability | Market Opportunity | Potential Partners | Benefit |
|---|---|---|---|---|
| Nav | • Routing & Directions<br>• POI search | • Business search placement | • Yelp<br>• OpenTable<br>• Michelin Guide | |
| Mobile Service | • Text<br>• Newscaster<br>• Phone calls<br>• 3rd party apps | • Generating carrier traffic | • ATT<br>• T-Mobile<br>• Bouyges<br>• Orange<br>• Sprint | Oscaro Data Collection |
| Driving Data | • OBD2 reader<br>• GPS<br>• Trip data | • Driving data for partners | • Insurance:<br>Axa<br>Allianz<br>AAA<br>• Rental cars<br>• Auto manufacturers | |
| Music | 3rd Party Apps:<br>• Pandora<br>• Spotify<br>• TuneIn | • Account signup bounty<br>• Usage data sale | • Pandora<br>• Spotify<br>• TuneIn | |

Appendix B: Application General Presentation
a. Application Description

The Application Oscar is an application dedicated for the usage of your favorites application when you're driving.

Oscar allows user to use any functionality or doing any action in a safety mode. The user experience created is key in the capability to achieve in any situation. You can use at any time the 3 mediums :
- Touch Screen (button interfaces of the application)
- Physical buttons (from the car in the case of OE or from the cradle for aftermarket)
- Voice commands

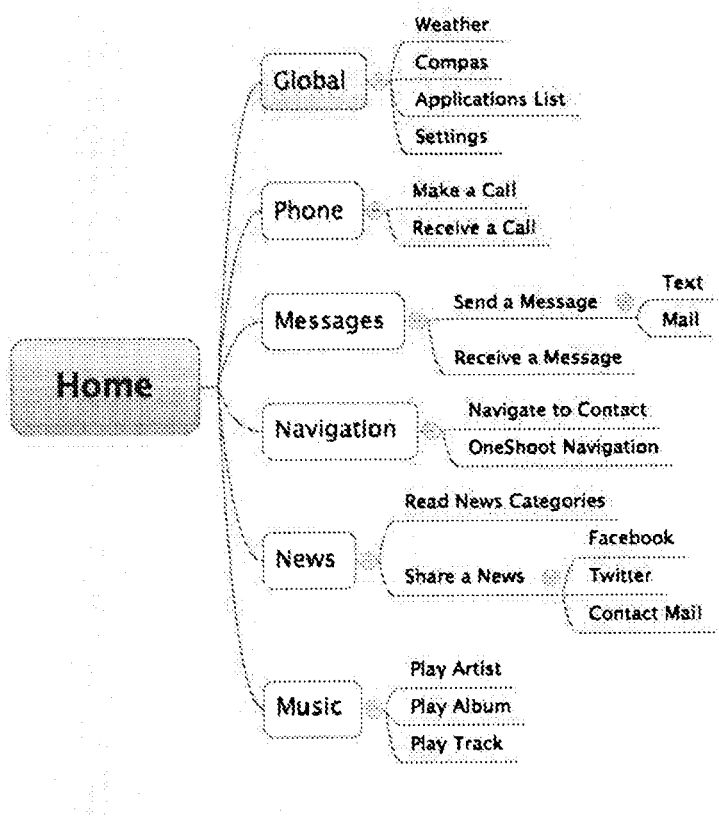

The key voice functionalities are :
- Make and receive a call
- Send and receive a messages (Text, Mail and Facebook)
- Define a navigation : one shoot.
- Read and share the News
- Play Music The application is based on the following Lemmas :
- The voice recognition is not working = limit the sentences of the user
- Natural Interaction = as soon closed as possible of a humans dialog
- Limit the feedbacks length of the agent = short sentences
- Limit the negative feedbacks of the agent = not, no, I don't know, …
- Limit the user repetition = don't ask "say again"

These 5 Lemmas are the central key of the creation of any user experience.

b. Application Architecture

Please go to the c. User Experience based on the Architecture
  d. Key Innovations detected
    i. Continues Dialog
    ii. Full Screen Agent Activation
    iii. Auto WakeUp
    iv. List Navigation
      1. Voice Navigation : Next, Previous, First, Last
      2. Alphabetic Go To
      3. Voice Play the List
        a. Voice feedback optimization
          i. From the query
          ii. From the previous play
        b. Play by Steps
      4. Selection
        a. By Number of the Item targeted
        b. By Partial Content of the Item targeted
      5. Intelligent Selection
        a. Learning from the driver usage
    v. List Filter
      1. Alphabetic Filter
      2. History Filter
      3. Frequency History
      4. Successive Filter
    vi. Button Pixels User Experience
    vii.

- Phone Module
  e. Introduction
  f. Structure
  g. Description
  h. User Experience

- Messages Module
- Navigation Module
- News Module
- Media Module

Appendix C:
Voice and Connected Platform

Executive summary

The car market is living one of his new evolution that we can call a car market disruption as it's living so many different kind of ruptures. From the electric engine to the driverless car, the digitization of the car is moving forward and the entire car constructor are facing one of their big challenges regarding the digital life cycle versus the vehicle life cycle!
But at the end of the day, the driver is the voice, the voice who wants to stop to spend time alone on the road, this time that can be transformed on a useful and interesting time if we can create new user experience in constraint environment, if we can connect the car to the digital world and more than that the user with his favorite's applications in any context!
xBrainSoft created the Car Personal Assistant Product, an extensible and flexible platform working with all devices of the market in a continuous user experience in and out of the car, allowing hybrid mode and synchronized update over the air mode between his cloud and car embedded platform.
The best one of each environment at the right time, in any context! XXXXX is ready to face the challenge of the short life cycle of the digital world without affecting the car life cycle!

Technical chapter

*Summary*

The xBrainSoft Voice & Connected Platform is an advanced platform that in some embodiments is made to establish the link between On-Board and Off-Board environments.
Based on a hybrid, modular and agnostic architecture, Voice & Connected Platform provides its own "over the air" updates mechanisms between its Embedded Solution and Off-Board Platform. From embedded dialog management with no connectivity to Off-Board extended semantic processing capabilities, Voice & Connected Platform enhances hybrid management with context synchronization enabling scenarios around "loss and recovery" of the vehicle connectivity.
Built on a robust, innovative and fully customizable Natural Language Understanding technology, Voice & Connected Platform offers an immersive user experience, without relying on a particular speech technology.
Its multi-channels abilities allow interactions through multiple devices (vehicle, phone, tablet...) in a pervasive way, sharing the same per-user context due to full synchronization mechanisms.
The clusterized server architecture of Voice & Connected Platform is scalable and therefor responds to a high load and high consumption of services. It is built on industry-standard technologies and implements best practices around communications security and end user privacy.
Voice & Connected Platform also offers a full set of functional and developer tools, integrated in a complete development environment, to invent complex Voice User Interaction flows.

*Added-value*

You'll find below some of the technical breakthroughs of xBrainSoft Technology, the « Voice & Connected Environment » who is composed by a cloud platform and an embedded platform.
The following items are presented as bullet point.
- *<u>Hybrid Designed : "Server, Embedded and autonomous Synchronization"</u>*

By design, the Voice & Connected Platform provides an assistant that runs both locally and remotely. This hybrid architecture of any assistant is built on strong mechanisms to distribute the processing, maintain full context synchronization and update user interfaces or even dialog understanding.

- *Set of Functional Tools for Dialog flows creation*

From the origin, xBrainSoft is putting a lot of efforts on providing the best set of tools around our technology to accelerate and improve the assistant's developments. It includes a full developer environment that enhances the dialog language manager, the reusability of functional modules, the deployment automation or maintenance of any VPA and the portability on any client devices.

- *Identities and Devices Federation Services (VCP-FS)*

The Voice & Connected Platform Federation Service is a service that federates user identities and devices. VCP-FS deals with social identities (Facebook, Twitter, Google+) and connected devices owned by a user, which enhance the capacities and functionalities provided by a Virtual Personal Assistant in a pervasive way. VCP Federation Services enhances user experience by making use of user's social networks and even his habits.

- *Suite of Car Applications ready (CPA)*

On the top of the Voice & Connected Platform, xBrainSoft provides a suite of applications for the vehicle to create the Car Personal Assistant (CPA) Product, used either by voice, touch screen or physical buttons as Weather, Stocks, News, TV Program, Contacts, Calendar, Phone, and more.

xBrainSoft also proposes a SDK to create fully integrated applications that can gain access to the car's CAN network, its GPS location and various vehicle sensors like temperature, wipers status, engine status and more.

- *Off-Board Data Synchronizer*

The Voice & Connected Platform provides a global data synchronizer system. This mechanism covers the synchronization problematic caused by the itinerancy and low capacity of mobile data connections. It provides a configurable abstraction of the synchronization system with the intention of permitting developers to focus on which data needs to be synchronized and not how it is done.

- *External APIs Auto-Balancer*

Using External APIs is a great enhancement for scenarios but has a side effect when a service could become unavailable or if the client may want to use a specific service depending on multiple factors (Price, User Subscription ...). To answer these specific requirements, Voice and Connected Platform was designed to be highly configurable and integrate $3^{rd}$ data providers as plug-in (ex: APIs consumption management by event handlers to connect on a micro-billing management system).

Functionalities do not rely on a single external API, but on an internal provider that can manage many of them. Following this architecture, VCP provides an auto-balance system that can be configured to meet XXXXX requirements.

- *Proactive Dialog*

Voice & Connected Platform integrates an expert system and mechanisms to start a dialog with a user without initial request.
Together they provide a set of tools that achieve complex tasks, as giving relevant informations once user attention is available or to manage proactive dialog frequency.
- *True Context Dialog Understanding*

The "True Context Dialog Understanding" is a contextual and multidimensional dialog flow with parameters like: context history, dialog history, user history, user profile, localization, current context domain and more.
This contextual approach of analyzing each dialog allow the best one accuracy understanding of any dialog flow and many other positive effects as the minimizing the necessary memory to stock the knowledge of an assistant, the continuity of a dialog after any kind of break, the simplification of the translation of any application, and more.
- *Update over the air*

The VCP global data synchronizer mechanisms offers a way to update any kind of packages "over the air" between the cloud platform, the embedded platform and any connected devices during all the life of the vehicle. Internally used to synchronize dialogs, UI, logs, snapshots between our online and embedded solution, this "over the air" system can be extended to include third party resources as Embedded TTS Voices, Embedded ASR Dictionaries. Based on a versioning system, a dependency manager and high compression data transfer, this provides $1^{st}$ class mechanism for hybrid solutions.
- *Continuity of Services to any Devices*

The Voice & Connected Platform, through the VCP Federation Service, is able to provide the continuity of service without interruption over the driver identities and devices. Due to the multiplication of connected devices, the driver attention accessible by the XXXXX Virtual Personal Assistant exceeds the time spent in the car.
- *Vocal & Acoustics agnostic integration*

The Voice & Connected Platform does not rely on a particular Speech Technology and can use either a local Speech Engine or a remote Speech Provider for both Speech Recognition and Text-To-Speech. Local ones are encapsulated in VCP plug-ins and they can be updated easily through the VCP data synchronization mechanisms. The remote speech provider can be managing directly on the cloud side with the VCP.
Defining which Speech Technology VPA is using for Speech Recognition and Text-To-Speech is completely configurable for any dialog.
- *Artificial Intelligence Algorithms*

Focusing on getting results in constraints timing, Voice & Connected Platform takes an agnostic approach regarding AI. This is why we create or integrate $1^{st}$ class out-of-the-box tools in an abstract way into the platform as we have done with our Events based Expert System using CLIPS engine.
Our expertise stays in the Natural Language, Knowledge Graph, Machine Learning, Social Intelligence and General AI Algorithms. Our set of tools is the link between the top frameworks and open-sources algorithms available today to allow XXXXX to integrate continuously the last evolution in this science domain.

- *Natural Language Understanding agnostic integration*

In the same way as the strategy adopted for the Artificial Intelligence algorithms, Voice & Connected Platform takes an agnostic approach to integrate the Natural Language Processing modules. Based on our expertise in this area, this allows us to update frequently one of our core modules to optimize the accurate understanding and guaranty a unique user experience.

Technical architecture

Architecture

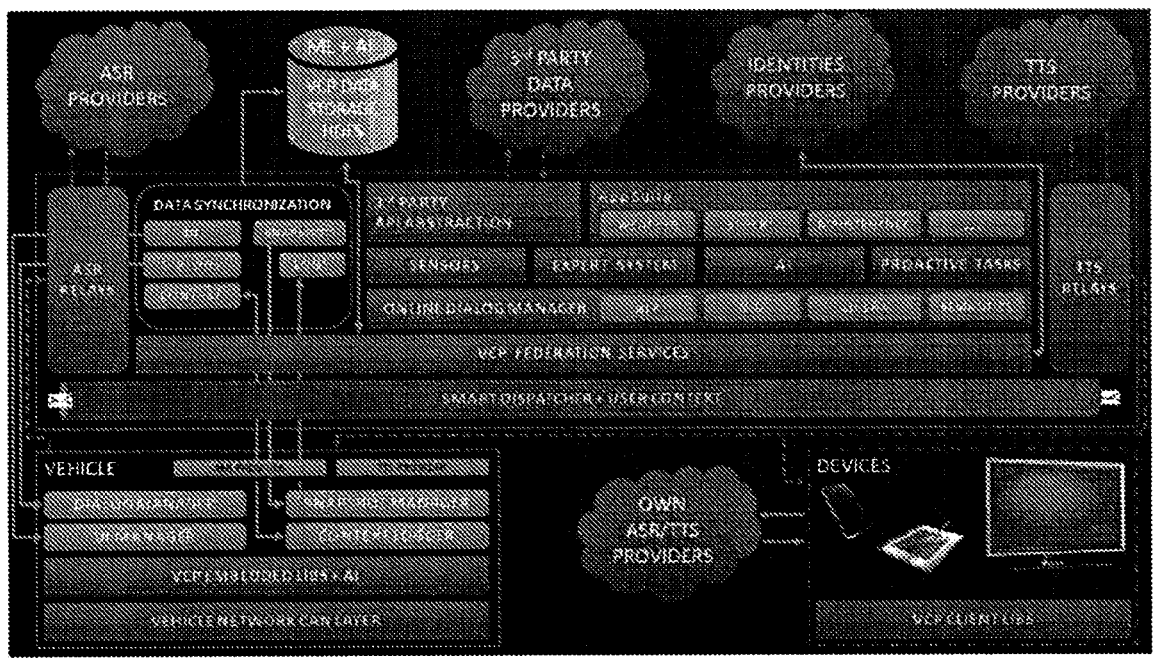

Architecture description

Voice & Connected Platform is based on an asynchronous pipeline called "Smart Dispatcher". His responsibility is to deliver messages and user context across the entire platform and connected devices.
VCP Federation Services is responsible of user identities management across the platform. It relies on 3rd party Identities Providers for numeric & social identities as My XXXXX, Facebook, Twitter, Google+ and Microsoft Live. It also possesses an internal mechanism to federate all the connected devices of a user like his car, phone, tablets, TV...
The Voice & Connected Cloud Platform offers an agnostic modular architecture over the "Smart Dispatcher" and a complete synchronization mechanism to work with the VCP Embedded Solution. Able to abstract ASR or TTS on a functional level with automatic ASR/TTS relay, VCP Server relies on 3rd party ASR/TTS providers such as Nuance, Google Voice, Telisma, CreaWave, etc.

The Voice & Connected Cloud Platform also includes all the technical blocks provided by the VCP Platform for dialog management empowered by semantics tooling. Coupled with events based expert system, sensors, AI and proactive tasks, this provides the core stack used to develop applications.

3rd party data providers are included in an abstract way to support fallback scenarios or rule based selection over user profile preferences or XXXXX business rules. This entry point allows the VCP to integrate all existing XXXXX connected services and make them available to application development level.

The VCP Embedded Solution is the vehicle counter part of VCP Server. Updatable "over the air", this Embedded Solution provides:
- UI delivery & management
- On-Board dialog management
- Context logging for "loss and recovery" connectivity scenarios
- Snapshot manager for logs or any other 3rd party synchronization In the vehicle architecture, an embedded ASR and TTS provider may be included for on-board dialog management and is not provided as a component of the Voice & Connected Platform. VCP Data Storage is an Apache Hadoop based infrastructure used to store and analyze all data inputs of the Voice & Connected Platform. Used for machine learning or AI processing, VCP Data Storage provides mechanism to inject analyses results in user profiles stored in VCP Federation Services.

*Technical detail by field*

Vocal & acoustics

- Description

Vocal & Acoustics life cycle is one of the most important interactions to create a $1^{st}$ class user experience. This needs to be taken with high level attention and high level components to achieve the quality expected.
Getting the expected quality can achieved by combining multiples aspects:
- o Top quality of the Microphones, filters, noise reduction, echo cancelation...
- o Integration of multiples ASR / TTS providers (Nuance, Google, Telisma, Microsoft Speech Server...)
- o Ability to switch between those providers regarding the use case:
  - ASR: On-Board, Off-Board Streaming or Off-Board relay
  - TTS: On-Board, Off-Board, Emotional content, mixing continuity mode
- o An ASR corrective management based on the User Dialog Context
- o A "True Dialog" management At xBrainSoft, we classified those aspects in two categories:
- o From the voice capture to the ASR process ending
- o After the ASR process, through the Natural Language Processing to the Natural Language Understanding As being an ASR Provider or Hardware Microphone manufacturing is not in our business scope, we took a technical agnostic approach on voice management to be able to integrate and communicate with any kind of ASR/TTS engine. Our experiences and projects led us to a high level of expertise of those technologies in constraints environment as done during the VPA prototype with Nuance material integration.
This type of architecture allows our partners to quickly create powerful dialog scenarios in many languages with all type of ASR or TTS. This also allows upgrading easily any component to improve the user experience.
The second category is managed by different levels of software filters based on the User Dialog Context. As a dialog is not only and set of bidirectional sentences, we developed in the Voice & Connected Platform different filters based on a "True Context Dialog Understanding". The true context dialog understanding is a contextual and multidimensional dialog flow with parameters like: context history, dialog history, user history, localization, current context domain and more.
Empowered with our VCP Semantics Tools, we achieve a deep semantic understanding of the user input.
This approach allowed us to reduce the "News & Voice Search" application (Newscaster) from 1.2 million language patterns entry points to less than 100 while keeping the same exacts meanings in term of end user dialog flows.
This new approach of the description of the patterns brings many positives aspects:
- o Simplify the disambiguation scenarios, error keywords or incomplete entities extraction
- o Simplify the debugging of the patterns and allow creation of automation tools o Simplify correction and maintenance of patterns "on the fly"
o Minimize memory resources to load patterns dictionary
o Minimize the effort of any dialog translation for language adaptation Complete hybrid and "over the air" updatable system, VCP components "Online or Embedded Dialog Manager" aim to provide the best solution to manage embedded dialogs when the vehicle loses its connectivity to a full online dialog experience.

Thus, asked for $1^{st}$ class material, Voice & Connected Platform guaranty to be the most efficient to create the best user experience ever intended.

In the meantime, xBrainSoft continue to push the limit of User Experience with the adjunction of many research aspects as Sentiment Analysis in the dialog flow, Social & Educative behavior level in User Context inferred from social and dialog flows or prosody management based on VoiceXML standard.

- Innovative features
  o Agnostic approach of ASR/TTS providers
  o Off-Board ASR/TTS relay capacity
  o On-Board Dialog management
  o Off-Board Dialog management
  o Hybrid Dialog management with "over the air" updates
  o VCP Semantic Tools
  o Integrated Development Environment for dialog management

- Example Elements
  o High quality microphones & sound intake
  o Vocal signal treatment including noise reduction, echo canceling
  o Microphone Audio API supporting automatic blank detection
  o One or more Speech Recognition engine for On-Board & Off-Board
  o One or more Text to Speech engine for On-Board & Off-Board
  o VCP Embedded Solution
  o VCP Server

- Example Associate partners

Sound intake: Parrott or Nuance
Vocal signal treatment: Parrott or Nuance
ASR: Google, Nuance or Telisma
TTS: Nuance, Telisma or CreaWave

Hybrid structure & behavior

- Description

A connected and cloud based Personal Assistant that can be autonomous when no data connection is available. The aim is to be able to always bring a fast and accurate answer to the user.

The VCP Embedded Solution consists of a Hybrid Assistant running on embedded devices, such as a car, and connected to server-side counterpart. Any user request is handled directly by the embedded assistant that decides, upon criteria like connectivity, if it should forward it to the server or not. This way, all user requests can be handled either locally or remotely. Off board level of capabilities can be easily tuned to enhance performances and user experience.

Like Voice & Connected Platform, the VCP Embedded Solution provides advanced Natural Language Processing and Understanding capabilities to deal with user requests without the need of a data connection. This ensures that VPA quickly understand locally any user request and, if needed, is able to answer directly to the user and to asynchronously fetch heavy computational response from the server. In case of a lack of connectivity, if external data are needed to fully answer to the user (weather request by example), the response is adapted to notify the user that his request cannot be fulfilled. According scenarios, VPA is able to queue the user request so it can forward it to the server as soon as the connectivity is restored.

The Voice & Connected Platform also provides the full context synchronization between the embedded agent and the server so that the data is shared between them instead of being separated. A resynchronization is performed each time a problem of connectivity occurs to ensure that data are always up to date.

The VCP Embedded Solution is made of plug-ins that can be easily updated or exchanged through an "over the air" process. Speech, IA, Dialog Understanding, Data Processing and User Interfaces are parts of those upgradable modules.

The VCP Embedded Solution is also composed a set of scripts, part of the AI, to process responses. To ensure consistency in the response, whatever the level of connectivity, these scripts are synchronized between the server and the embedded agent.

- Innovative features
  o User Interface Manager
  o Local interfaces synchronized with the server
  o Embedded Dialog Manager
    - Pure embedded scenarios
    - Hybrid scenarios On-Board / Off-Board
    - Pure Off-Board scenarios Always answering to user requests with or without internet connection
Context synchronization on connection lost use cases

- Example Elements

Linux platform available on the car computer system.

- Performances

Efficient performance driven programming language (C++)
High compression of exchanged data to optimize bandwidth and response time
VCP Embedded Solution has been compiled and tested on a Raspberry PI Model A:
  o CPU: 700 MHz Low Power ARM1176JZ-F Applications Processor
  o RAM: 256MB SDRAM

Artificial intelligence

- Description

Artificial Intelligence is a large domain covering a lot of disciplines as:
- Deduction, reasoning, problem solving
- Knowledge Graph discovery
- Planning and Acting by Events Based Expert System
- Natural Language Processing and Semantic Search
- Machine Learning, Map Reduce, Deep Learning
- Social Intelligence, Sentiment Analysis, Social Behavior
- Other usage not yet discovered At xBrainSoft is aware of the huge competencies scope and remains modest in front of the currents challenges of the science status.
Focusing on getting results in constraints timing, Voice & Connected Platform takes an agnostic approach regarding AI. This is why we create or integrate $1^{st}$ class out-of-the-box tools in an abstract way into the platform as we have done with our Events based Expert System using out-of-the-box CLIPS engine.
Our expertise stays in the Natural Language, Knowledge Graph, Machine Learning, Social Intelligence and General AI Algorithms.
The main characteristic of our set of tools is to be the glue between the top frameworks and open-sources algorithms available today.
Thereby, xBrainSoft can deliver 100% of the expected scenarios of the VPA project as it is possible to switch our modules by any other more valuable one available on the market.
This is why xBrainSoft is also working with partners like Kyron (Silicon Valley, AI, Big Data & Machine Learning applied to healthcare), Visteon or Spirops to extend the possibilities of AI available through our platform.

- Innovative features

Capacity to provide data to external AI modules in an anonymized way. Users or Sessions are represented as random unique numbers so external system can work at the right level without being able to correlate that information to a physical user
Agnostic approach to embed AI in Voice & Connected Platform (VCP) with xBrainSoft or external AI tools
Bridge to VCP Federation Services provided by VCP to get data back from AI tools and enhances the user profile for better user context management
- Example Elements
  - VCP Data Storage based on Apache Hadoop
  - VCP Events based Expert System
  - VCP Federation Services

Off-Board Platform & Services

- Description

To enrich the services provided to the user in his car, the Off-Board Platform brings a high level of connected functionalities due to its high availability and powerful components. The user is set at the center of a multi-disciplinary and intelligent eco-system focused on car services. The Off-Board Platform is also the entry point which brings functionalities that mix automotive and connected services.
The Off-Board Platform has a high availability to support all the cars of the brand and connected devices of users. It is able to evolve during time to handle more and more users, and deal with load fluctuations.
To answer all of those challenges, Voice & Connected Platform offers a clustered architecture that can be deployed "In the Cloud" or On-Premise. All clustered nodes know of each other which enable cross-nodes connected devices scenarios to maintain service continuity over a clustered architecture.
The Voice & Connected Platform offers the ability to consume 3rd data services, from technical data services to user informations through its social accounts and devices. All those informations are useful to create "pertinent" and intelligent scenarios.
The scope of functionalities and services is wide, and will evolve through time because of technological advances. The architecture of the platform should provide new services/functionalities without affecting existing functionalities based on its modular architecture.

- Innovative features
  - In the Cloud or On Premise hosting
  - Ready to go Clustered Architecture Deployment for high availability and load fluctuations
  - Devices-to-devices capability over clustered architecture

- Example Elements
  - VCP Server
  - 3rd party data providers

- Performances

5k concurrent connected objects (cars) per server, the prototype implements a set of 3 servers to guaranty a high level of SLA and will propose 10k concurrent connected object in front.

Off-Board frameworks & general security

- Description

As a 3$^{rd}$ party data service provider, XXXXX SIG can be used by the Voice & Connected Platform in addition to our current implemented providers. Due to a high level of abstraction, we can implement different 3$^{rd}$ party data service providers and integrate them during the project lifecycle without updating the functional part of VPA.
Voice & Connected Platform provides facilities to implements fallback scenarios to ensure high availability of data through external providers. For example, multiples weather data providers in order to switch when the major one is not available.
Voice & Connected Platform also provides an implementation of his Expert System for provider eligibility. Based on business rules, the system helps managing billing optimization. It could be used at different levels as the user one based on subscriptions fees or platform one based on supplier transactions contracts.
As Voice & Connected Platform can be exposed a complete set of HTTP APIs, it can be easily integrated in any kind of Machine to Machine network.
On communication and authentication, Voice & Connected Platform provides state-of-the-art practices used in the Internet Industry. From securing all communications with SSL certificates to Challenge Handshake Authentication Protocol, Voice & Connected Platform ensures a high security level related to end user privacy.
Security and user privacy are also taken into account during VCP Federation Services Identities association as the end user login and password never transits through the Voice & Connected Platform. All this system is based on Token Based Authentication provided by the Identity provider, in example: For a Facebook account, the end user authenticates on Facebook server that confirms the end user identity and provides us back an authentication token.
The way VCP Embedded Solution is built prevents from reliability or safety issues in the car as it relies on underlying existing functions provided by integrators. In our technical proposal, VPA cannot send direct orders to the car but he can send orders to the underlying system that provides reliability and safety issues.
  - Innovative features
    - Modular architecture enabling full integration of XXXXX Connected Services APIs
    - My XXXXX can be implemented as the default Identity Provider of VCP Federation Services helping the user to feel safe when linking his social identities
    - High level security to protect end user privacy

- Example Elements
  - A secured infrastructure for car connection as a M2M network
  - Token based authentication API to implement a VCP Federation Services Identity Provider

Context & history awareness

- Description

An efficient context management is essential to dialogs, assistant behavior or functionality personalization. Implemented at engine level, user context can be accessed by any component of the Voice & Connected Platform to enable enhanced personalized experience.
Extensible with any source of data - as vehicle data (CAN, GPS...), social profiles, external systems (weather, traffic...), user interactions... - user context is also heavily used by our Events based Expert System to create proactive use cases.
Shared across On-Board and Off-Board, Voice & Connected Platform takes care of context resynchronization between the two environments.
Regarding history awareness, Voice & Connected Platform provides a complete solution for aggregating, storing and analyzing data. Those data can come from any source as described above. When analyzed, data results are used to enrich the user profile to help delivering a personalized experience.

- Innovative features

Integrated as an engine feature, User Context management is transversal in the Voice & Connected Platform. It can be accessed in any module, dialog, task or rule within the system. It can also be shared across devices with the implementation of VCP Federation Services.
Voice & Connected Platform provides a full context resynchronization system between On-Board and Off-Board to handle connectivity issues like driving through a tunnel.
Based on Apache Hadoop stack and tools, VCP Data Storage provides an infrastructure ready to perform Machine Learning goals as user behaviorism, habits learning and any other related Machine Learning classification or recommendation task.

- Example Elements
  - VCP Data Storage
  - Define the Hadoop Infrastructure based on requirements

Proactivity

- Description

Proactivity is one of the key to create smarter applications for the end user.

VC Platform provides two distinct levels of proactivity management:
- Background Workers: A complete background tasks system that can reconnect to the main pipeline and interact with user sessions or use fallback notifications tools
- Events based Expert System: A fully integrated Business Rules Engine that can react to external sensors and user context Coupled with VCP Federation Services, it leverages the power of proactivity beyond devices.
- Innovative features
  - Events based Expert System that proactively reacts to context items in real time
  - Use of VCP Federation Services to enable cross devices proactive experience
  - Provide implementation of majors Notification Providers for proactive fallback use case (Google, Apple, Microsoft...)
  - On a functional point of view, level of proactivity tuning can be exposed as a user setting

- Example Elements

VCP Federation Services for devices knowledge
Devices supporting Notifications process for fallback use case

General upgradeability

- Description

General upgradeability is a crucial process regarding automotive industry. As the car is not going that often to the car dealer, the overall solution should provide a complete mechanism of "over the air" updates.
Voice & Connected Platform already implements those "over the air" mechanisms with his VCP Embedded Solution to synchronize dialogs and user interfaces.
Based on a factory architecture, this "over the air" process can be extended to manage any kind of data between the Voice & Connected Platform and a connected device.
- Innovative features
  - Extensible "over the air" mechanism including versioning support, dependency resolution and communication compression
  - VCP Server is based on a modular architecture that allows adding or remove (new) modules during the vehicle life.
  - VCP Embedded Solution is based on a plugin architecture that allows adding new interoperability functionality to access new car functions or messages

- Example Elements
  - An internet connection (depending on the hardware and type of connection)

In & out continuity

- Description

Devices Continuity means that through the Voice and Connected Platform, the driver can connect to the Virtual Personal Assistant in the car but outside in the street or at home as well. He can use services from everywhere he wishes to.
This capability allows XXXXX to extend the reach of its relationship with its customer in and out of the car. The brand expands the opportunities to offer service and generate engagement beyond its traditional zone. Thus, it opens room for a larger number of potential business partnerships with $3^{rd}$ party operators who can bring competitive APIs or Services.
Based on VCP Federation Services, VPA may be fully integrated in the end user eco-system. From his car, his multiples devices to his numeric and social identities, all the inputs of that eco-system may empower his pervasive experience.

- Innovative features

Voice & Connected Platform provides its services through a standard secured protocol (HTTPS) that can be accessed from all recognized devices. As an end-to-end point of view, Voice & Connected Platform provides framework and tools for all major devices platforms as Android, iOS, Windows + Windows Phone and Embedded.
VCP Federation Services aggregates devices and numeric identities of a user, to give him the best connected and pervasive experience. For example, VCP can start a scenario on the user phone, then in his car to end it on another device.
VCP User Interface Manager is able to download, store and execute VCP Web Objects on any devices providing a web browser API. Considering this, user interfaces and logic of applications on connected devices could be cross platform, and easily "over the air" updatable. VCP User Interface Manager is also able to apply a different template/logic for a specific platform, region or language.

- Example Elements

VCP Federation Services is at the center of service continuity.
Due to heterogeneity of connected devices (platform, size, hardware, usage ...), scenarios should be adapted to best suit the targeted device. For instance, a device may not have a microphone, which wouldn't be compliant with a Vocal User Interface, physical interaction should be used.

Culture and geographical contexts

- Description

Due to the high internationalization of XXXXX, VPA is able to adapt to users in a culture or geographical point of view. This implies the translation of all scripts and interfaces provided to users, the configuration of ASR & TTS providers, and the modification of the behavior of some scenarios if needed.

- Innovative features

Based on a complete modular architecture, Voice & Connected Platform modules can be plugged according to internationalization settings. This allows managing different services delivery or features depending on the region.

Voice & Connected Platform provides a complete abstraction of ASR/TTS providers relay that can be based on region deployment or user settings. This allows a unified entry point for Voice Recognition and Speech Synthesis for cars or connected devices taking in charge the separation of concerns between the voice acquisition/playback and ASR/TTS providers.

VCP Dialog Manager and VCP Semantic tools provide a high level of abstraction that allows extensibility for new languages without impact on the functional implementation.

- Example Elements
    o External 3rd party data providers supporting translation through their APIs
    o ASR / TTS provider(s) for the selected language(s)
    o Define the end user social identities for VCP Federation Services, in example: Weibo for China instead of Twitter
    o Adapt use cases and VPA behavior to end user culture and region

Appendix D: "Direct & Workaround Scenario Process"

Described is a generic approach and where we'll find our added value regarding other products like Siri, Google Now, Nuance, ... or any type of personal assistant according to various embodiments.

Legend :

- VCP = Voice and Connected Platform
- ASR = Automatic Speech Recognition
- TTS = Text to Speech
- TUI = Touch User Interaction
- VUI = Voice User Interaction
- NLU = Natural Language Understanding The VCP is synchrone and asynchrone. It mean that each action, event can be execute directly or with a long time after the request from the user. I can ask to the agent to send me my sales reporting each month 1st (asynchrone) for long task or long term task. and I can ask for the weather of today and directly after its answer the weather of tomorrow (with the Direct Context).

The description of the life cycle (See Figure 7) start from the bottom left to the upper right.

*Life Cycle*

*ASR Engine :*

- Before ASR (Automatic Speech Recognition), we can activate the ASR from 3 ways :
    - ASR Auto Wake-up word : availability to use any keyword to wake-up the application and launch the ASR (as : Angie, Sam, ADA, ...)
    - ASR Proactive Activation : depending on internals or externals events
        - Timer : auto wake up each day based on a timer
        - Internal Event : any internal event from the device components (GPS, Accelerator, ...) or any function or module of the application.
            - we detect you're located to your home and we can start the ASR (TTS with a Contextual Prompt) to as you something
            - When I'm located in my car (because I detect the power and OBD), I can propose you to launch the music and start a navigation
            - When you've a new appointment in your calendar, the agent can start automatically and ask you if you want an navigation to go to your next meeting (if car needed)
        - External Event : we detect any external event from database or 3rd APIs to activate the ASR / TTS

- When you arrive near from your destination, the system can look in external Parking Availability APIs to let you know when you can park your car.
- When you are in the traffic jam, the system can evaluate the redirection by car but also the opportunity to change how you are going to your destination and propose you to park your car and take the train.
  - ASR Push Button : activation of the agent from a simple click (push) on a virtual button (screen) or physical button (from the cradle or the wheel button)
- Activation of the ASR (voice input)
- ASR to NLU Pre-Processing = based on the Context of the Application, we can take the sentence (with its confidence) and rework it before to send to the Natural Language Understanding Engine
  - because we know that we are in a module context to make a call, we can get out or change any word in a sentence before to send to the NLU engine.
  - in French, when the user say :
    - "donne-moi l'information technologique" => the ASR can send us "Benoit la formation technologique" (completely out of the user intention)
    - we can fix the words : 'Benoit' by 'Donne-moi' and 'formation' by 'information'
    - after the pre-processing the sentence will completely extend its opportunity to be understand by the NLU and create the action for the user.

*NLU Engine :*

- Detection of the Intention of the user to launch a particular module, each detection works in the context of the application as explain in the next chapter below.
  - Samples
    - Call Gregory = Phone Module
    - Send a text to Bastien = Message Module
  - Keywords = keywords to access directly in a module
    - Phone = give access to the phone
    - Navigation = give access to the navigation
  - Shortcuts = are sentences the user can say from any place in the application, only for the main actions as listed in the schema.
- Detection of the action (function) from the module (intention)
  - Samples
    - make a call = action to make a call to Gregory Renard
    - this sentence allow to detect the module, the action and the entity (Person = Gregory Renard)
- Default Module List = because, we know exactly what the application can do and not do, we can detect the user is trying to do something that the application can not do or maybe we've got a bad return from the ASR. In this cases, we can activate the default module to try to detect the sens of the intention of the user (typically where Siri and Google Now push the user to a web search).
- o Proposition to the user of the list of the modules available in the application (not limited, we can extend the list of module from any type of application needed)
- o if the user is said something wrong again or if the voice recognition is not working = the system propose to switch from the sentence voice recognition to a number recognition
  - User said something the system not recognize, the system will say = "what application do you want to launch" + open the list of the applications
  - if the user said again something the system not recognize, the system will say = "what's the number of the application you want" (we use this workflow in any type of list as contacts, address, albums, artists, news categories, messages)
- o The user make a choice
- The system show the default item list for the module and propose (by voice and / or visual) the functions available in the module. The user can in this case made a choice with a guidance to achieve.
  - o the list can be :
    - filter : Call Malvoisin => filter on Celine = show the list of Celine Malvoisin for a contact list
    - filter by letter : based on any list, you can create a filter letter after letter
      - the user can say : filter on the letter M, letter A, letter L, ... (this allow to access to not pronounceable contact.
      - the filter by letter filter any word in the items labels.
    - filter by letter navigation : based on any list, the user can say "go to the letter V'
      - the agent will directly show all the contacts start with the letter V
    - Navigate : the user can navigate the list as
      - Next / Previous = to show the next or previous list of items in the current list
      - Start = to show the first items in the list
      - End = to show the last items in the list
  - o The list can be read at any time :
    - in any screen of items list, the user can ask to read the list
    - the list will be read as following
      - each item is read and following by number to help the user to memorize the item number
      - the content of each item will be read if the previous item contact don't integrate a part that we already know.
        - imagine we have 5 contacts Malvoisin in a phone number list (3 diffrents type of phones for Celine, 1 for Luc and 1 for Gregoire)
        - the agent will say : (we don't repeat any content when the agent is speaking)

- Celine, Mobile US is the number 1 (no Malvoisin because It was my request and I know I want Malvoisin contacts when I'm reading)
- Home is the number 2
- Office is the number 3
- Luc, Mobile si the number 4
- Gregoire, Home is the number 5

- Item Selection by the user
    - Item Number Selection = allow the user to select an item from the number in front of the item (we only working with number from 1 to 5)
    - Item Content Selection = allow the user to select an item from the label of the item (ex : celine)
- After the detection of the Tuple = Module, Function and Entity (Item Selection)
    - the system can execute the processing with 2 types of functions
        - knowledge type = access to a data knowledge (QA, Catalogue, Wikipedia, …) to give an answer to the user.
        - action type = need to manage and access to external / internal APis
- Based on the result of the NLU processing describe below, the system generate 2 synchrone elements :
    - TUI = Touch User Interaction (design of the screen for the user as any type of application)
    - VUI = Voice User Interaction (voice feedback with the capacity to ask more information or details to the user, or to ask an other question)
    - The VUI and TUI are completely synchrone, you can go to the next step of the functional workflow by touch or voice, the both are synchrone
        - if you clic on the screen to select an item, you'll go to the next step and the agent know your context position in the application.
        - this context position allow the voice to be synchrone with the visual
- Based on the current workflow, the agent can detect if it need more information to complete the current intention of the user and ask for it with a new launch of the ASR (after send the sentence feedback to the TTS)
    - User : What's on the TV tonight ?
    - System : On which Chanel (because the intention of the user is detected by TV = module and Tonight = part of the action Chanel Prime Time Tonight)>
        - the system understand it miss a variable to complete the action and ask for it.
    - User : On channel One
    - System : Here is the prime on channel One …. blablabla
    - User : and channel Two (in this case, we use the context to know what was the current intention and last action from the user = TV / Give the tonight's prime show)
    - System : Here is the prime on channel Two …. bliblibli
    - … and the system can continue to this context with no limit, we call this workflow the "Direct Context"
- Based on the previous point (Management of the Intention / Context), we can use difference types of context o   See description in the below point.

*The Temporal Context Matrix Dependency.*

Before going in the types of Context, we need to define the Context created in the VCP from xBrainSoft.

The Context is (define as a current context)

- working as a 3D storage matrix :
    o   Dimension 1 : Current Module (module phone)
    o   Dimension 2 : Current Action (action make a call in module phone)
    o   Dimension 3 : Current Screen (step of the action, ex : selection of the contact for the action call in the module phone)
- where you can save in any storage case (context field) any type of information by a Tuple with at minima 3 items (Object Type, ID 'Name' and Values) with the capacity to extend at any level of items of storage.
    o   any type of variable (int, string, Date, ...)
    o   any type of serializable object (Car Type, User Type, ...)
- with the capacity to use the history = 4D Storage Matrix (the context is a work in progress by the Time Variable)
    o   each Time status is saving for the user session for short and middle term
    o   each Time status can be save in a file or database for a long term The Context is in relationship with the functional current workflow of the user to give the possibility to create the Intention Learning for middle and long term.

We can have 2 Categories of Context :

- Application Context = a General Context share by many users (all users of the application or a part of users of the application) in a short, middle or long term.
- Session Contest = the Context for a unique user.

Types of Context :

- Direct Context : see above for description.
- Indirect Context (Temporal Context) = after any question / answer between the user and the agent (with or without Direct Context), the user can go to an other module / function where he can use the direct context again. But after this point, the user can access to the previous direct context module to continue his dialog with the system as describe below :

- User : What's the weather => Agent give me the weather in Palo Alto (he detected my device GPS information to fin my location and give me the weather in Palo Alto)
- User : and in San Francisco => Agent find my last direct context and give me the weather in SF
- User : what time is it there => Agent understand I want to change the intention module and fin back from the previous context the variable he need to complete the query for the time in SF (hour)
- User : and what's the weather tomorrow => the agent detect I want to come back to the weather module (new intention), he find in my last weather query the place and give me the weather for tomorrow in SF.
- // the indirect context can persist in the time with saving in a long terme storage as a file or database.  same for the direct context who become an indirect context if there is any disconnection in any action in a module.

- Intention Learning (IL) = Based on the the above descriptions, we can easily imagine how to create the Intention Learning with a weight to each tuple of module/action/screen/workflow.
  - What is the IL = the capability of the system to understand the sens of the query of the user based on his history queries, the workflow executed and the results achieved (is like an Intelligent Macro for Personal Assistant).
  - Sample 1 (simple) =
    - Time 1
      - User : Please can you Call Louis ?
      - System : I have many Louis in your contacts list, which one you want ?  (I have 3 Louis)
      - User : Monier (= Family name)
      - System : Ok, I call Louis Monier
    - Time 2
      - User : Call Louis!
      - System : I call Louis Monier, is it right ?
        - User : Yes ... The system call Louis Monier.
        - User : No ... Ok, I have several Louis in your contact list, ... (the system show me the same list as in the second step of the Time1)
    - Time 3 :
      - User : Call Louis right now !
      - System : I call Louis Monier. (the system make a call)
  - Sample 2 (more complex) =
    - Time 1
      - User : send a message to Louis
      - System = Who is the contact you want to send a message
      - User : Louis Monier (or Louis + filter Monier, Or Monier + Filter Louis)
      - System = ok, you want to send a text or a mail ?
      - User = a Text

- System = Right, what type of content you want to send (I can choose for a free text, template text of vocal text)
- User = Free Text
- System = Say your message to send
- User say the message
- System ask for the confirmation of the message content, the content and for the validation to send
- User can say yes or change contact, message, add more content message or cancel.
- Time 2
  - User : send a message to Louis
  - System = Say your message to send
  - User say the message
  - System ask for the confirmation of the message content, the content and for the validation to send
  - User can say yes or change contact, message, add more content message or cancel.
- Sample 3 (more complex)
  - Time N
    - User = each wednesday, the user when he leave the office at 6pm call his wife before going to the house (ask for the kids ready to go to the sport)
      - for that, the user need to use a sample like the #1 above to call his wife.
      - the system is using many information sources = BT data, OBD data (or not), Time (6pm), Localisation (not at home), history intention (as an agenda reminder + geofencing)
    - System = When the user arrive in his car (detected by the Car BT connection or OBD Connecter) and after x minutes (average time to install himself in the car),
      - the system automatically come back to the user and say :
        - System : "Greg, do you want I start the navigation to your home and call your wife."
          - User : Yes => call action to Celine Malvoisin is starting
          - User : No => the agent don't do anything and notice the downgrade of the Intention Learning Item.

In one embodiment, the IL was created to limited the ASR interaction with the User and optimize the time to achieve on any action the agent need to execute. The IL store the Generic Workflow execution based on the current context and ask for the parameters it cannot find by itself.

I have many other sample of IL of the system, as one I'll deploy in the next week... I'm a french guy and the English ASR System don't recognize well my voice (about my french accent), in the case I want to send you a text in english with the system, I can use the Sample 2 and just before sending the text to you, I can ask to translate the text in english (I have demo for you if you want), the system will translate my french sentence in english and send it to you. In the same time, he'll understand you're speaking english and it will use the TTS in English (by default) for any message from you (before a validation you send me a text in english). //funny how we can hack so easily complex task ;p = Real Time Text Translation by Voice.

Another interesting point is that we can disconnect the context or intention to give a priority to any keyword or shortcuts sentences from any place in the application of workflow.

Appendix E: Context

Context : the current status of existing personal assistants

Today, the personal assistant have got a first level of context, mainly to help them to understand the sentence of the user and try to recognize well the words. The following sample explain how they work

- I want to call Renaud => First name
- I'm driving with a Renault => Brand Car Here is the relationship and context definition to define which [Renaud,Renault] the system need to interpret and send back to the user. The Context is also used in particular cases as What's the weather ... and tomorrow (localization as a context variable, but it can be just a process with the simple localization variable shared between the 2 steps).

Challenges for

The main challenge with personal assistant is to create a true dialog exchange between the user and the agent.

To understand this aspect, we need to understand the qualification of a "true dialog" :

- Continue Dialog Management as any human discussion (not a question answering)
    - Capability to ask information about Yahoo... who is the founder, what's the stock and the news (the agent remember the topic)
- Context Dialog Information Memory : for short, middle and long term
    - Capability to remember information in the discussion flow
- Context Status of a Process Workflow Memory : for short, middle and long term
    - Capability to remember where you was (step) in a process or discussion workflow (to generate or not an action) to give the capability to continue the Process or Workflow at any time in the future.

On top of that, we need to generate the evolution of the language used by the agent to exchange with the user. And more than that, we need to give the perception of empathy from the agent.

The Generic Context Mgt by xBrainSoft

The context, as explain during our last call, as built with 4 components :

1. The Context Client Side Holder (CCSH)
   This first component allow the client storage, usage and the definition (Value) of the context workflow from the client side (robot, smartphone, vehicle, home, ... ) to share with the server side. The CCSH is a Fx with API to create, use and define the values of the context workflow from the client side and send it through the CSP below.

2. The Context Synchronisation Protocol (CSP)
   This second component define the protocol (standardisation) of the key access (Context ID) for each property (variable) of the status or sub-status of the current context, it validate the format and existence of the key access. They can be a simple text variable (Name/Value) or a particular Object with his instance. The goal of the CSP is a communication protocol and it's building by 2 framework implementation on each side of the Agent (Client / Server), it's in charge to validate the right protocol communication between the client and the server and be sure the context information are well delivered and synchronized.

3. The Context Agent - Server Side Holder (CA)
   This third component allow the server storage, usage and the definition (Value) of the context workflow from the server side (online server) to share with the client side through the CSP. The CA is a Fx with API to create, use and define the values of the context workflow from the server side and send it through the CSP above.

4. The Context Engine
   This last component allow the variable sharing level and the middle and long term session in a data storage (on any support).
   The short term storage is manage by the Current Session shared between the client and the server sides.
   It can define the type or classification of the context type of topic (a variable can be a simple variable or an serialized object + value(s)).
   1. Current User Profile = any information about the user profile (Facebook Profile, App Profile, ...)
   2. Current Module = any information about the module (Phone, Messages, Navigation, News, .... )
   3. Current Function = any information about the function (make a call, receive a call, send a text, read a news, share a news, ... )
      1. Call Louis for Call Louis Monier can be load from the middle/long term context engine that learned Louis = Louis Monier.
   4. Current Screen = any information about the screen currently show to the user.
   5. Custom Data = APIs to let the developer use the Context in any aspect he want (new context shape)
   6. Workflow History = any information about the position in the workflow of the user with the information about : screen showed or show, variable value at a particular step, workflow status, ...
      1. I ask to share a news on Facebook and after I said "Continue", the agent will go to the next news in the list of news for the current category. The agent know from the context : the current category, the step in the news reading where it was... and he can send me at the right intent the user need.

Process

1. The Voice and Connected Platform is working in a synchronous and asynchronous mode, we need to validate at any time a perfect synchronization of the context between the Client and the Server sides.
2. Each Module, Function, Screen, Application, Session or any status and more need to be identify with a unique ID (Context ID) to be shared between the client and the server.
3. The Context ID (information storage memory) and its value are stored on each Side of the Agent (Client / Server) and it synchronies between both sides at each interaction.
4. The Context ID allow :
    1. to create filters and contextual action based on the values of the variables (simple variable or object) : If ... then ... that ...
    2. to find in the middle or long term storage the information needed to load in the short term memory (or by Machine Learning from the global users behaviors / Application Level, the probability for the value requested)
    3. to know the step where we are in the workflow, the step before (or by Machine Learning from the global users behaviors, the probability for the next step).
    4. ... and more we are discovering from this innovation.

How it work (Life Cycle)

- After any ASR and just before the NLU Process, the device is sending with the sentence message a hidden part with the current context ID from the device.
- The agent is looking the Key Access (Context ID) before execute any Natural Language Understanding
    - the agent is looking the content and filter the global language dictionary of action and understanding for the current context.
- The agent launch the NLU Process in the Context understanding
    - the action is launch (APIs access or knowledge access)
    - the agent interpret the sense of the query of the user ... (see mail before)
- Before giving the answer to the device (or any kind of end point),
    - the agent send the new context (module/function/screen) through the answer message in a hidden part (as like the header for HTML Page)
    - the new context can be define from many variable :
        - current screen in the end point unit
        - current module, function
        - sentences, dialog and choices workflow of the user.
- The agent merge the answer (package with voice, screen, information) to send to the device (end point) for rendering to the user.
- The client side execute the package and store the current context.
    - a context can be forced from any screen, function or module.. in the case of the Home Screen, we force the reset of the context and let the user start from a clean interaction with the agent.

In the case of context conflict between the server and the client (end point), the client (end point : device, vehicle, home) is the Master because he is representing the actions of the user (real Master).

*Usages Samples :*

- Contextualizes the Louis to select when the user say : I want to call Louis (based on his history call behavior) => call Louis Monier
- Contextualizes the process to execute : Send a Message to Louis
    - the system know : Message = email, Louis = Louis Monier
    - allow the voice shortcuts ... and cut 2 steps in the workflow to send an email to Louis Monier.
- Contextualizes the next step to execute : in many session, I ask the news order = Eco, Politic and Sport. Next time I ask for Eco, the Agent will propose you to read the Political and Sport news.
- Contextualizes the next step based on the Application global predictive workflow.
- Contextualizes an action requested and understand it's not targeted for the current context and can use it for the previous action.
    - I'm reading the list of news, I'm asking for the weather, I say "continue", the agent is going to the next news.
- Contextualizes particular words as "Music" ... asking in the context of News that can be the Musical News or the Music on your phone ?
    - out of the Music Context, it's clearly to access to the Music tracks of the device
    - in the News Context, it can be for play music of the news, the agent understand and come back to the user to ask more precision.
    - if the user say, play music in the news context, the agent understand the user don't want to read the news.
- Because we know the current context, we can contextualizes any input voice recognition and change the words in the sentences before trying to understand the sense of the sentence... or at the opposite, extend the vocabulary available in a particular context to start any action.
    - A second effect is we don't need to create may patterns to validate an action (ex : Music can be catch in any sentences, short or long in the context of the root screen to launch the action of playing music)
    - A third effect is for the translation, because you can limit for each context module/function/screen the keywords to catch the action intended by the user
        - play in the context of TV is to play game or tv show
        - play in the context of a sport is to play a new game
        - play in the context of a discotheque is to play music
        - ... 1 word, many intention depending of the context... easy to translate in any language
    - A fourth effect is the support of any agent because the dictionary can be very limited.
        - in the case of the newscaster, we catch "News" (+synonyms) and the News Topics Entities.

- Creation of the pipeline of the tasks priorities
    - I'm currently creating a message for a contact (generally, I want to go to the end of the action)
    - I receive during this time a text from a contact, the system will look the current context and know when the user is in a process of creation of a message, he don't need to interrupt the current action
    - the agent create a pipeline of message and at the end of the creation message context, he'll propose me to read the message (when the context is changing)
- Translation of any message depending of the context
    - I create a message to Mark (he is speaking EN and I create the message in Fr), the system know, based on the context of message that he need to validate if he know the language of the receiver before sending to translate it.

The context workflow is the status of the Context Matrix (Module, Function, Screen) in the process workflow from the start of the end of the user session. We created a system allow a computer to create an Intuition from the collective intelligence (Numeric Intuition Generation) from the Intent Learning.

Just a few note about the preceding :

- as explained, we're working in a synchronous and asynchronous mode.
    - this 2 paths are used to allow the proactivity and more for the asynchronous mode.
    - to allow the 2 sides to know where are the both status on each sides for the dialog.
- addon for the life cycle :
    - for the 1st point : Also can send during application navigation (tactile interactions), not only from the ASR.
    - for the 5th point : the package can be send with all or partial content
        - we may send all elements without the Voice integrated and in this case, the agent will manage the whole rendering and the creation/edition of the context.

What is claimed is:

1. A computer-implemented method comprising:
   receiving, at a first user device, a first audio input from a user, the first audio input associated with a dialogue and requesting a first action;
   determining, at the first user device, a first context of the user;
   initiating the first action on the first user device;
   subsequent to initiating the first action, receiving, at a second user device distinct from the first user device, a second audio input from the user continuing the dialogue and requesting a second action related to the first action;
   determining a tuple describing user intent associated with the second action based on the second audio input, the tuple missing an element;
   determining the missing element of the tuple using the first context to complete the tuple;
   initiating the second action on the second user device based on the completed tuple;
   determining, using a machine learning model, an action pattern of the user based on the first context of the user and one or more past contexts of the user;
   predicting a third action of the user based on the action pattern of the user; and
   proactively providing to the user a recommendation based on the predicted third action of the user.

2. The computer-implemented method of claim 1, wherein the first context includes one or more of a context history, a dialogue history, a user profile, a user history, a location, and a current context domain.

3. The computer-implemented method of claim 1, further comprising:
   determining a dictionary based on the first context of the user; and
   determining a first tuple describing user intent associated with the first action by performing Natural Language Understanding (NLU) on the first audio input using the dictionary; and
   initiating the first action on the first user device based on the first tuple.

4. The computer-implemented method of claim 1, further comprising:
   determining a first tuple describing user intent associated with the first action based on the first context of the user and one or more past contexts of the user; and
   initiating the first action on the first user device based on the first tuple.

5. The computer-implemented method of claim 1, further comprising:
   detecting an event; and
   responsive to detecting the event, proactively initiating the dialogue, wherein the dialogue is between a voice assistant and the user and is performed using the first user device.

6. The computer-implemented method of claim 5, wherein the event includes one or more of an internal event associated with the first user device, an external event associated with the user, an input of a wake-up phrase, an input of a user input, and an expiration of a timer.

7. The computer-implemented method of claim 1, further comprising:
   proactively initiating the dialogue based on a second action pattern.

8. The computer-implemented method of claim 1, further comprising:
   subsequent to initiating the first action, receiving a third audio input from the user requesting the third action, wherein the third action is unrelated to the first action;
   initiating the third action;
   subsequent to initiating the third action, receiving a fourth audio input from the user continuing the dialogue and requesting a fourth action related to the first action;
   determining a fourth tuple describing user intent associated with the fourth action based on the fourth audio input, the fourth tuple missing another element;
   determining the another element of the fourth tuple using the first context to complete the fourth tuple; and
   initiating the fourth action based on the completed fourth tuple.

9. The computer-implemented method of claim 1, further comprising:
   creating an input shortcut based on the second audio input and the completed tuple.

10. A system comprising:
    one or more processors; and
    a memory storing instructions that when executed by the one or more processors, cause the system to perform steps including:
      receive, at a first user device, a first audio input from a user, the first audio input associated with a dialogue and requesting a first action;
      determine, at the first user device, a first context of the user;
      initiate the first action on the first user device;
      subsequent to initiating the first action, receive, at a second user device distinct from the first user device, a second audio input from the user continuing the dialogue and requesting a second action related to the first action;
      determine a tuple describing user intent associated with the second action based on the second audio input, the tuple missing an element;
      determine the missing element of the tuple using the first context to complete the tuple;
      initiate the second action on the second user device based on the completed tuple;
      determine, using a machine learning model, an action pattern of the user based on the first context of the user and one or more past contexts of the user;
      predict a third action of the user based on the action pattern of the user; and
      proactively provide to the user a recommendation based on the predicted third action of the user.

11. The system of claim 10, wherein the first context includes one or more of a context history, a dialogue history, a user profile, a user history, a location, and a current context domain.

12. The system of claim 10, comprising instructions that, when executed by the one or more processors, cause the system to:
    determine a dictionary based on the first context of the user; and
    determine a first tuple describing user intent associated with the first action by performing Natural Language Understanding (NLU) on the first audio input using the dictionary; and
    initiate the first action on the first user device based on the first tuple.

13. The system of claim 10, comprising instructions that, when executed by the one or more processors, cause the system to:

determine a first tuple describing user intent associated with the first action based on the first context of the user and one or more past contexts of the user; and initiate the first action on the first user device based on the first tuple.

14. The system of claim 10, comprising instructions that, when executed by the one or more processors, cause the system to:

detect an event; and responsive to detecting the event, proactively initiate the dialogue, wherein the dialogue is between a voice assistant and the user and is performed using the first user device.

15. The system of claim 14, wherein the event includes one or more of an internal event associated with the first user device, an external event associated with the user, an input of a wake-up phrase, an input of a user input, and an expiration of a timer.

16. The system of claim 10, comprising instructions that, when executed by the one or more processors, cause the system to:

proactively initiate the dialogue based on a second action pattern.

17. The system of claim 10, comprising instructions that, when executed by the one or more processors, cause the system to:

subsequent to initiating the first action, receive a third audio input from the user requesting the third action, wherein the third action is unrelated to the first action;

initiate the third action;

subsequent to initiating the third action, receive a fourth audio input from the user continuing the dialogue and requesting a fourth action related to the first action;

determine a fourth tuple describing user intent associated with the fourth action based on the fourth audio input, the fourth tuple missing another element;

determine the another element of the fourth tuple using the first context to complete the fourth tuple; and initiate the fourth action based on the completed fourth tuple.

18. The system of claim 10, comprising instructions that, when executed by the one or more processors, cause the system to:

create an input shortcut based on the second audio input and the completed tuple.

\* \* \* \* \*